US012732334B2

(12) United States Patent
Gheorghiu et al.

(10) Patent No.: US 12,732,334 B2
(45) Date of Patent: Sep. 8, 2026

(54) CHANNEL RASTER FOR IMPROVED SPECTRAL EFFICIENCY

(71) Applicant: QUALCOMM Incorporated, San Diego, CA (US)

(72) Inventors: Valentin Alexandru Gheorghiu, Yokohama (JP); Peter Gaal, San Diego, CA (US); Masato Kitazoe, Hachiouji (JP)

(73) Assignee: QUALCOMM Incorporated, San Diego, CA (US)

( * ) Notice: Subject to any disclaimer, the term of this patent is extended or adjusted under 35 U.S.C. 154(b) by 335 days.

(21) Appl. No.: 18/506,710

(22) Filed: Nov. 10, 2023

(65) Prior Publication Data

US 2024/0163064 A1 May 16, 2024

Related U.S. Application Data

(60) Provisional application No. 63/486,538, filed on Feb. 23, 2023, provisional application No. 63/383,901, filed on Nov. 15, 2022.

(51) Int. Cl.
*H04L 5/00* (2006.01)

(52) U.S. Cl.
CPC .................................. *H04L 5/0092* (2013.01)

(58) Field of Classification Search
CPC ..................................................... H04L 5/0092
USPC .......................................................... 370/329
See application file for complete search history.

(56) References Cited

U.S. PATENT DOCUMENTS

2021/0385663 A1* 12/2021 Mozaffari ........... H04L 27/2607
2022/0110120 A1* 4/2022 Mozaffari ............. H04L 5/0062

OTHER PUBLICATIONS

International Search Report and Written Opinion—PCT/US2023/079458—ISA/EPO—Apr. 10, 2024.
Moderator (Ericsson): “Email Discussion Summary for [102-e][139] FS NR eff BW Util”, 3GPP TSG-RAN WG4 Meeting # 102-e, R4-2206439, 3rd Generation Partnership Project, Mobile Competence Centre, 650, Route Des Lucioles, F-06921 Sophia-Antipolis Cedex, France, vol. RAN WG4, No. Electronic Meeting, Feb. 21, 2022-Mar. 3, 2022, Mar. 4, 2022, 23 Pages, XP052123441, p. 2-p. 9.
Nokia., et al., “Discussion on Contentious Issues of SIB1 Signalling and CBW configuration”, 3GPP TSG-WG RAN4 Meeting #105, R4-2219706, Type Other FS_NR EFF_HW_UTIL, 3rd Generation Partnership Project, Mobile Competence Centre, 650, Route Des Lucioles, F-06921 Sophia-Antipolis Cedex, France, vol. 3GPP RAN 4, No. Toulouse, FR, Nov. 14, 2022-Nov. 18, 2022, Nov. 7, 2022, 7 Pages, XP052213606, p. 8-p. 10 section 2.1.

(Continued)

*Primary Examiner* — Christopher R Crompton
(74) *Attorney, Agent, or Firm* — QUALCOMM Incorporated

(57) ABSTRACT

Certain aspects of the present disclosure provide techniques for channel raster design. A method for wireless communications by a network entity includes determining a channel raster comprising a subset of radio frequency (RF) reference frequencies separated by a channel raster granularity, wherein the channel raster granularity is less than 100 kHz and outputting an indication of one or more of the RF reference frequencies to one or more user equipments (UEs).

28 Claims, 19 Drawing Sheets

(56) References Cited

OTHER PUBLICATIONS

Nokia., et al., "TP to TR 38.844 on Larger CBW Approach: Signalling and Configuration Aspects", 3GPP RAN WG4 Meeting #102-e, R4-2205213, 3rd Generation Partnership Project, Mobile Competence Centre, 650, Route Des Lucioles, F-06921 Sophia-Antipolis Cedex, France, vol. RAN WG4, No. Electronic meeting, Feb. 21, 2022-Mar. 3, 2022, Feb. 14, 2022, 9 Pages, XP052112404, p. 4 section 2.5.

* cited by examiner

500

| SCS (kHz) | 5 MHz | 10 MHz | 15 MHz | 20 MHz | 25 MHz | 30 MHz | 35 MHz | 40 MHz | 45 MHz | 50 MHz | 60 MHz | 70 MHz | 80 MHz | 90 MHz | 100 MHz |
|---|---|---|---|---|---|---|---|---|---|---|---|---|---|---|---|
| | N_RB | N_RB | N_RB | N_RB | N_RB | N_RB | N_RB | N_RB | N_RB | N_RB | N_RB | N_RB | N_RB | N_RB | N_RB |
| 15 | 25 | 52 | 79 | 106 | 133 | 160 | 188 | 216 | 242 | 270 | N/A | N/A | N/A | N/A | N/A |
| 30 | 11 | 24 | 38 | 51 | 65 | 78 | 92 | 106 | 119 | 133 | 162 | 189 | 217 | 245 | 273 |
| 60 | N/A | 11 | 18 | 24 | 31 | 38 | 44 | 51 | 58 | 65 | 79 | 93 | 107 | 121 | 135 |

*FIG. 5*

| NR operating band | Channel Raster Granularity (kHz) | Uplink Range of N_Ref (First - <Step size> - Last) | Downlink Range of N_Ref (First - <Step size> - Last) |
|---|---|---|---|
| n1 | 100 | 384000 – <20> – 396000 | 422000 – <20> – 434000 |
| n2 | 100 | 370000 – <20> – 382000 | 386000 – <20> – 398000 |
| n3 | 100 | 342000 – <20> – 357000 | 361000 – <20> – 376000 |
| n5 | 100 | 164800 – <20> – 169800 | 173800 – <20> – 178800 |
| n7 | 100 | 500000 – <20> – 514000 | 524000 – <20> – 538000 |
| n8 | 100 | 176000 – <20> – 183000 | 185000 – <20> – 192000 |
| n12 | 100 | 139800 – <20> – 143200 | 145800 – <20> – 149200 |
| n13 | 100 | 155400 – <20> – 157400 | 149200 – <20> – 151200 |
| n14 | 100 | 157600 – <20> – 159600 | 151600 – <20> – 153600 |
| n18 | 100 | 163000 – <20> – 166000 | 172000 – <20> – 175000 |
| n20 | 100 | 166400 – <20> – 172400 | 158200 – <20> – 164200 |
| n24 | 100 | 325300 – <20> – 332100 | 305000 – <20> – 311800 |
| n25 | 100 | 370000 – <20> – 383000 | 386000 – <20> – 399000 |
| n26 | 100 | 162800 – <20> – 169800 | 171800 – <20> – 178800 |
| n28 | 100 | 140600 – <20> – 149600 | 151600 – <20> – 160600 |
| n29 | 100 | N/A | 143400 – <20> – 145600 |
| n30 | 100 | 461000 – <20> – 463000 | 470000 – <20> – 472000 |
| n34 | 100 | 402000 – <20> – 405000 | 402000 – <20> – 405000 |
| n38 | 100 | 514000 – <20> – 524000 | 514000 – <20> – 524000 |
| n39 | 100 | 376000 – <20> – 384000 | 376000 – <20> – 384000 |
| n40 | 100 | 460000 – <20> – 480000 | 460000 – <20> – 480000 |
| n50 | 100 | 286400 – <20> – 303400 | 286400 – <20> – 303400 |
| n51 | 100 | 285400 – <20> – 286400 | 285400 – <20> – 286400 |

| NR operating band | Channel Raster Granularity (kHz) | Uplink Range of N_Ref (First - <Step size> - Last) | Downlink Range of N_Ref (First - <Step size> - Last) |
|---|---|---|---|
| n53 | 100 | 496700 – <20> – 499000 | 496700 – <20> – 499000 |
| n65 | 100 | 384000 – <20> – 402000 | 422000 – <20> – 440000 |
| n66 | 100 | 342000 – <20> – 356000 | 422000 – <20> – 440000 |
| n67 | 100 | N/A | 147600 – <20> – 151600 |
| n70 | 100 | 339000 – <20> – 342000 | 399000 – <20> – 404000 |
| n71 | 100 | 132600 – <20> – 139600 | 123400 – <20> – 130400 |
| n74 | 100 | 285400 – <20> – 294000 | 295000 – <20> – 303600 |
| n75 | 100 | N/A | 286400 – <20> – 303400 |
| n76 | 100 | N/A | 285400 – <20> – 286400 |
| n80 | 100 | 342000 – <20> – 357000 | N/A |
| n81 | 100 | 176000 – <20> – 183000 | N/A |
| n82 | 100 | 166400 – <20> – 172400 | N/A |
| n83 | 100 | 140600 – <20> –149600 | N/A |
| n84 | 100 | 384000 – <20> – 396000 | N/A |
| n85 | 100 | 139600 – <20> – 143200 | 145600 – <20> – 149200 |
| n86 | 100 | 342000 – <20> – 356000 | N/A |
| n89 | 100 | 164800 – <20> – 169800 | N/A |
| n90 | 100 | 499200 – <20> – 538000 | 499200 – <20> – 538000 |
| n91 | 100 | 166400 – <20> – 172400 | 285400 – <20> – 286400 |
| n92 | 100 | 166400 – <20> – 172400 | 286400 – <20> – 303400 |
| n93 | 100 | 176000 – <20> – 183000 | 285400 – <20> – 286400 |
| n94 | 100 | 176000 – <20> – 183000 | 286400 – <20> – 303400 |
| n95 | 100 | 402000 – <20> – 405000 | N/A |
| n97 | 100 | 460000 – <20> – 480000 | N/A |
| n98 | 100 | 376000 – <20> – 384000 | N/A |
| n99 | 100 | 325300 – <20> – 332100 | N/A |
| n100 | 100 | 174880 – <20> – 176000 | 183880 – <20> – 185000 |
| n101 | 100 | 380000 – <20> – 382000 | 380000 – <20> – 382000 |

| Frequency range | SSB frequency positions, $SS_{REF}$ | GSCN | Range of GSCN |
|---|---|---|---|
| 0 – 3000 MHz | N * 1200 kHz + M*50 kHz, N = 1:2499, M ϵ {1,3,5} | 3N + (M-3)/2 | 2 - 7498 |
| 3000 – 24250 MHz | 3000 MHz + N*1.44 MHz, N = 0:14756 | 7499 + N | 7499 - 22255 |

| NR operating band | SSB SCS (kHz) | Range of GSCN (First - <Step size> - Last) |
|---|---|---|
| n1 | 15 | 5279 – <1> – 5419 |
| n2 | 15 | 4829 – <1> – 4969 |
| n3 | 15 | 4517 – <1> – 4693 |
| n5 | 15 | 2177 – <1> – 2230 |
| | 30 | 2183 – <1> – 2224 |
| n7 | 15 | 6554 – <1> – 6718 |
| n8 | 15 | 2318 – <1> – 2395 |
| n12 | 15 | 1828 – <1> – 1858 |
| n13 | 15 | 1871 – <1> – 1885 |
| n14 | 15 | 1901 – <1> – 1915 |
| n18 | 15 | 2156 – <1> – 2182 |
| n20 | 15 | 1982 – <1> – 2047 |
| n24 | 15 | 3818 – <1> – 3892 |
| | 30 | 3824 – <1> – 3886 |
| n25 | 15 | 4829 – <1> – 4981 |
| n26 | 15 | 2153 – <1> – 2230 |
| n28 | 15 | 1901 – <1> – 2002 |
| n29 | 15 | 1798 – <1> – 1813 |
| n30 | 15 | 5879 – <1> – 5893 |
| n34 | 15 | {5032, 5043, 5054} |
| | 30 | 5036 – <1> – 5050 |
| n38 | 15 | {6432, 6443, 6457, 6468, 6479, 6493, 6507, 6518, 6532, 6543} |
| | 30 | 6437 – <1> – 6538 |
| n39 | 15 | {4707, 4715, 4718, 4729, 4732, 4743, 4747, 4754, 4761, 4768, 4772, 4782, 4786, 4793} |
| | 30 | 4712 – <1> – 4789 |

| NR operating band | SSB SCS (kHz) | Range of GSCN (First - <Step size> - Last) |
|---|---|---|
| n40 | 30 | 5762 – <1> – 5989 |
| n50 | 30 | 3590 – <1> – 3781 |
| n51 | 15 | 3572 – <1> – 3574 |
| n53 | 15 | 6215 – <1> – 6232 |
| n65 | 15 | 5279 – <1> – 5494 |
| n66 | 15 | 5279 – <1> – 5494 |
| | 30 | 5285 – <1> – 5488 |
| n67 | 15 | 1820 – <1> – 1888 |
| n70 | 15 | 4993 – <1> – 5044 |
| n71 | 15 | 1547 – <1> – 1624 |
| n74 | 15 | 3692 – <1> – 3790 |
| n75 | 15 | 3584 – <1> – 3787 |
| n76 | 15 | 3572 – <1> – 3574 |
| | 15 | 8475 – <1> – 8884 |
| n85 | 15 | 1826 – <1> – 1858 |
| n90 | 15 | 6245 – <1> – 6718 |
| | 30 | 6252 – <1> – 6714 |
| n91 | 15 | 3572 – <1> – 3574 |
| n92 | 15 | 3584 – <1> – 3787 |
| n93 | 15 | 3572 – <1> – 3574 |
| n94 | 15 | 3584 – <1> – 3787 |
| n100 | 15 | 2303 – <1> – 2307 |
| n101 | 15 | 4754 – <1> – 4768 |
| | 30 | 4760 – <1> – 4764 |

CHANNEL RASTER FOR IMPROVED SPECTRAL EFFICIENCY

CROSS-REFERENCE TO RELATED APPLICATIONS

This application claims benefit of and priority to U.S. Provisional Application No. 63/486,538 filed Feb. 23, 2023, and U.S. Provisional Application No. 63/383,901 filed Nov. 15, 2022, which are hereby assigned to the assignee hereof and hereby expressly incorporated by reference herein in their entirety as if fully set forth below and for all applicable purposes.

BACKGROUND

Field of the Disclosure

Aspects of the present disclosure relate to wireless communications, and more particularly, to techniques for a channel raster design.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a network entity. The method includes determining a channel raster comprising a subset of radio frequency (RF) reference frequencies. The subset of RF reference frequencies are separated by a channel raster granularity. The method includes determining a first channel center for a first channel having a first channel bandwidth at a first RF reference frequency of the subset of RF reference frequencies. The first channel bandwidth consists of an even number of total resource blocks (RBs). The method includes determining a second channel center for a second channel having a second channel bandwidth at a second RF reference frequency of the subset of RF reference frequencies. The second channel bandwidth consists of an odd number of total RBs. The first channel bandwidth and the second channel bandwidth overlap in frequency. The RB edges of the first channel bandwidth are aligned with RB edges of the second channel bandwidth. The method includes outputting an indication of the first channel center, the second channel center, or both to one or more user equipments (UEs).

Another aspect provides a method for wireless communication by a UE. The method includes receiving signaling from a network entity with an indication of a first channel center for a first channel having a first channel bandwidth at a first RF reference frequency of a channel raster including a subset of RF reference frequencies separated by a channel raster granularity. The first channel bandwidth consists of an even number of total RBs. The method includes receiving signaling from the network entity with an indication of a second channel center for a second channel having a second channel bandwidth at a second RF reference frequency of the subset of RF reference frequencies. The second channel bandwidth consists of an odd number of total RBs. The first channel bandwidth and the second channel bandwidth overlap in frequency. The RB edges of the first channel bandwidth are aligned with RB edges of the second channel bandwidth. The method includes communicating with the network entity using the first channel, the second channel, or both.

Another aspects provides another method for wireless communications by a network entity. The method includes determining a channel raster comprising a subset of RF reference frequencies separated by a channel raster granularity. The channel raster granularity is less than 100 kHz. The method includes outputting an indication of one or more of the RF reference frequencies to one or more UEs.

Another aspects provides another method for wireless communications by a UE. The method includes receiving signaling from a network entity with an indication of a set of RF reference frequencies of a channel raster. The channel raster includes a subset of RF reference frequencies separated by a channel raster granularity and the channel raster granularity is less than 100 kHz. The method includes communicating with the network entity using one or more of the set of RF reference frequencies of the channel raster.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 5 depicts a table with a total number of RB s for different channel bandwidths and different numerologies.

DETAILED DESCRIPTION

Aspects of the present disclosure provide apparatuses, methods, processing systems, and computer-readable mediums for channel raster design.

In certain wireless communication systems (e.g., such as 3GPP NR Release-17 systems and earlier), a 100 kHz global channel raster is defined and divides the spectrum into absolute radio frequency channel number (ARFCN), in which NR operation bands are assigned a range of ARFCN values. Different channel bandwidths are associated with different numbers of resource blocks (RBs) depending on the channel bandwidth and the subcarrier spacing (SCS). The number of RBs may be even or odd. Because the number of RBs for different channel bandwidths may be even or odd, channels of different bandwidths may not be placed on the same raster position with the 100 kHz.

In some aspects, the channel raster has a larger channel raster granularity providing additional flexibility. For example, aspects of the disclosure provide channel rasters of larger than the 100 kHz granularity, such a 50 kHz channel raster granularity, a 10 kHz channel raster granularity, and other larger channel raster granularities. In some aspects, with the larger channel raster granularity, different channel bandwidths can be configured in overlapping frequency spectrum where RB edges in the different channel bandwidths are aligned. This may provide enhanced spectral efficiency.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
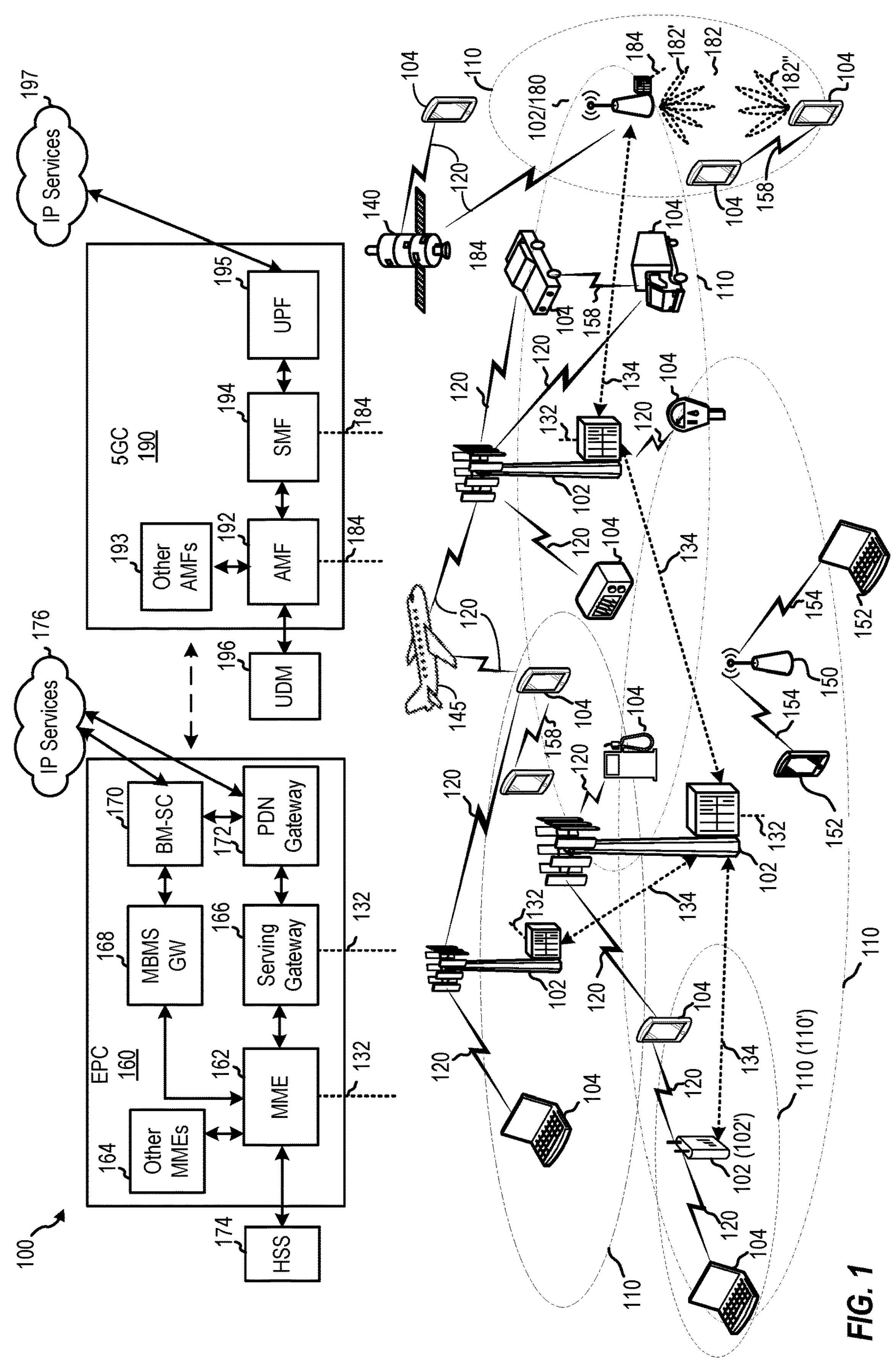
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
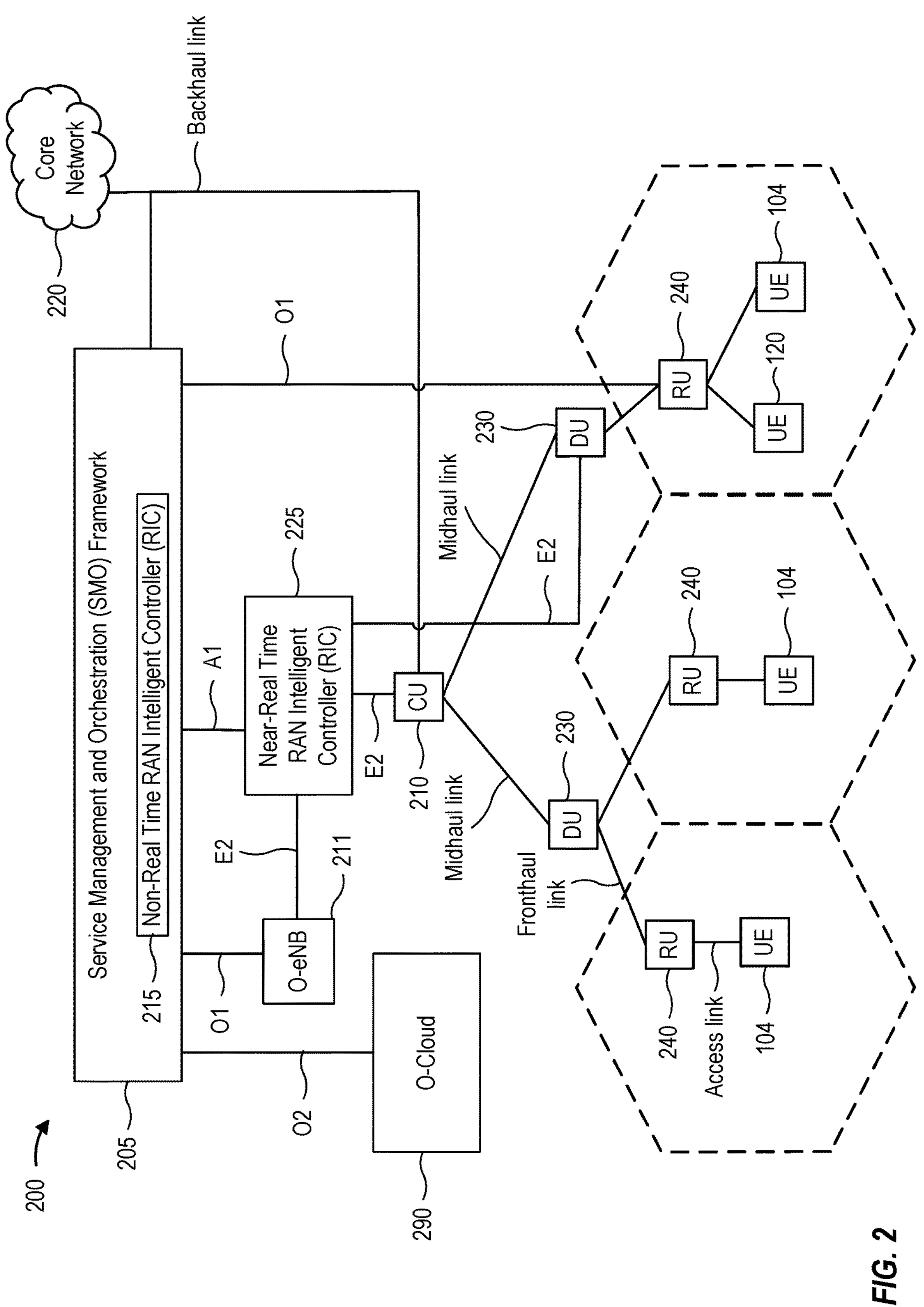
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BS s 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit—User Plane (CU-UP)), control plane functionality (e.g., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
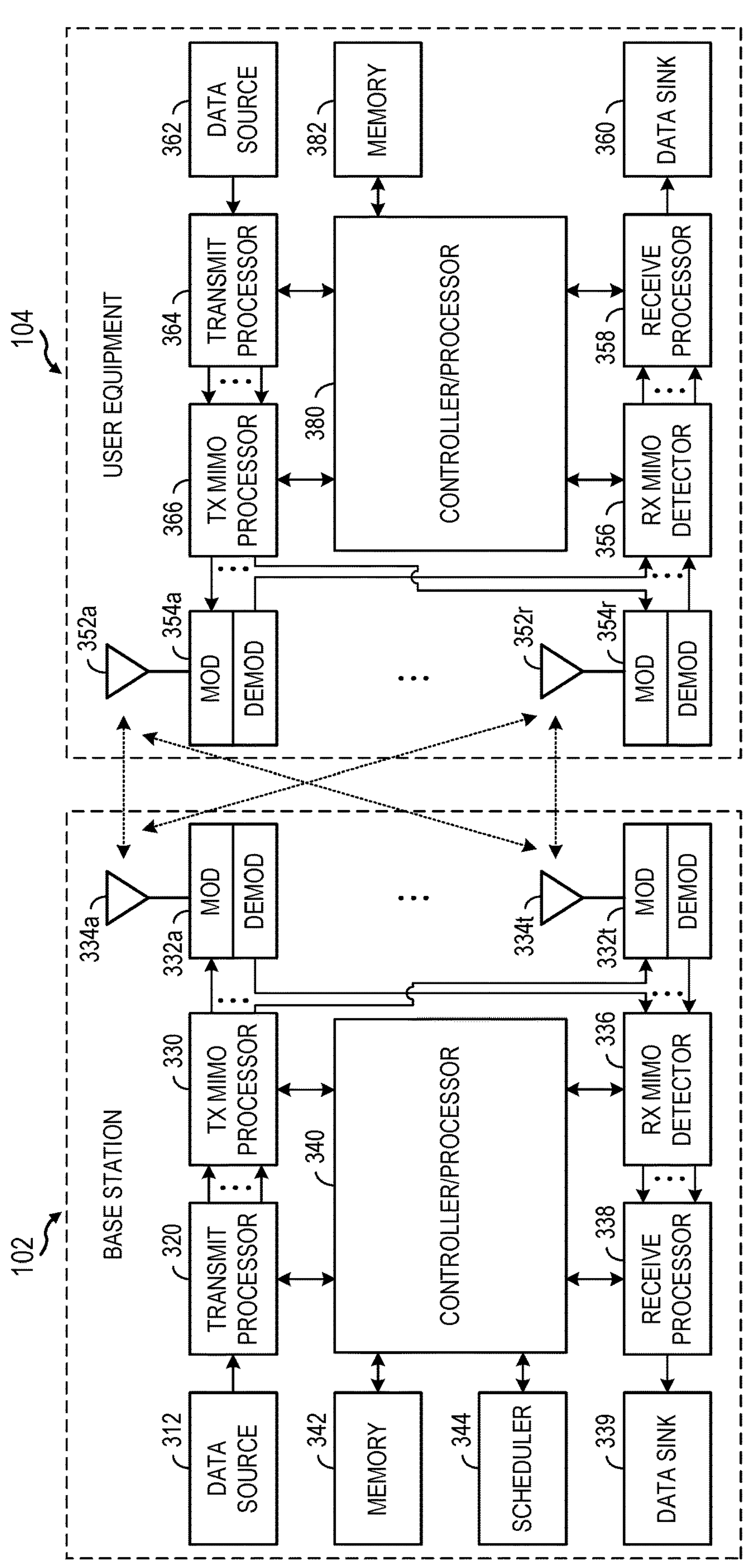
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor

340, TX MIMO processor 330, transceivers 332*a-t*, antenna 334*a-t*, and/or other aspects described herein. Similarly, “receiving” may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, “transmitting” may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, “receiving” may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
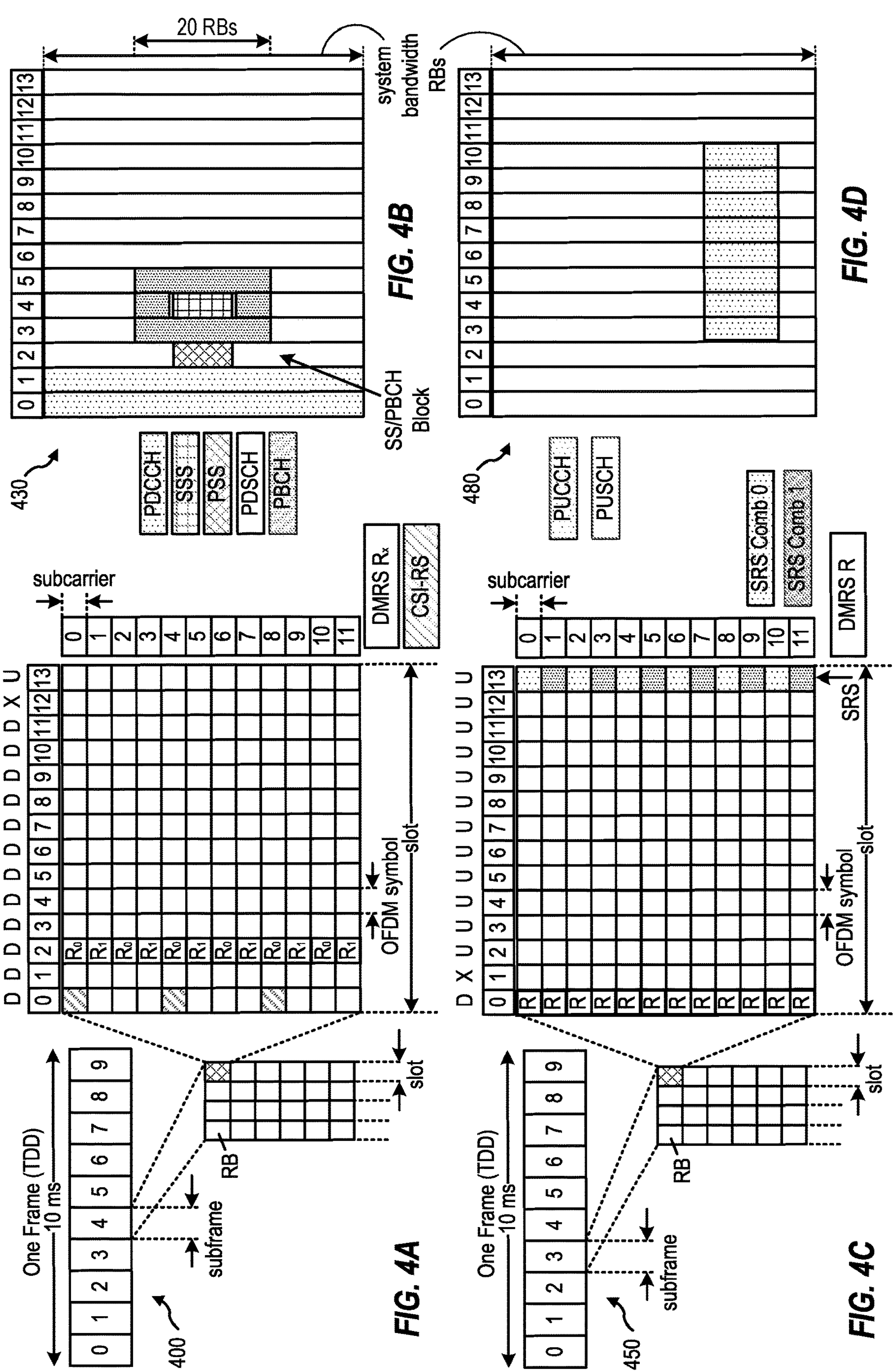
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and 2μ slots/subframe. The subcarrier spacing and symbol length/duration are a function of the numerology. The subcarrier spacing may be equal to $2^{\mu}\times 15$ kHz, where $\rho$, is the numerology 0 to 6. As such, the numerology $\mu=0$ has a subcarrier spacing of 15 kHz and the numerology $\mu=6$ has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RB s (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIB s), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Channel Raster Design

In some systems, a channel raster defines radio frequency (RF) reference frequencies. The RF reference frequencies are mapped to resource elements (REs) and resource blocks (RBs) to identify channel positions.

The system bandwidth may be partitioned into a number of operating bands in which uplink channels, downlink channels, or both uplink and downlink channels can be used for communications between user equipments (UEs) and network entities (e.g., base stations (BS s)). The channels can be configured with different channel bandwidths.

Different channel bandwidths may be supported within the same spectrum for transmitting to and receiving from UEs connected to a BS. A BS can transmit on multiple carriers or bandwidth parts (BWPs) to different UEs within the BS channel bandwidth. With carrier aggregation (CA), a BS can transmit on multiple carriers or BWPs to the same UE within the channel bandwidth of the BS.

A UE is configured with one or more carriers or BWPs. Each BWP or carrier is configured with a UE channel bandwidth. The location of the UE channel bandwidth, within the system bandwidth, for each UE carrier or BWP is flexible but should be located completely within the BS channel bandwidth.

Different UE channel bandwidths support different total numbers of RBs (e.g., the maximum transmission bandwidth configuration), $N_{RB}$. FIG. 5 depicts a table 500 with a total number of RBs for different channel bandwidths and different SCS. The total number of RBs for a channel depends on the channel bandwidth and the numerology (e.g., subcarrier spacing (SCS)). As shown in the table 500, some UE channel bandwidths have an odd number of total number of RBs (e.g., $N_{RB}$=25 for the 5 MHz UE channel bandwidth and the 15 kHz SCS) and some UE channel bandwidths have an even number of total number of RBs (e.g., $N_{RB}$=52 for the 10 MHz UE channel bandwidth and the 15 kHz SCS). As discussed in more detail below, this may lead to spectral inefficiency for certain channel raster granularities.

The spacing between carriers depends on the deployment scenario, the size of the frequency block available, and the channel bandwidths. In some systems, such as 5G new radio (NR) systems, the nominal channel spacing, between two adjacent NR carriers with a 100 kHz channel raster, is equal to $(BW_{Channel(1)}+BW_{Channel(2)})/2$, where $BW_{Channel(1)}$ and $BW_{Channel(2)}$ are the channel bandwidths of the two respective NR carriers.

A global frequency channel raster defines a set of RF reference frequencies, $F_{REF}$. The RF reference frequency is used in signaling to identify the frequency position of RF channels, synchronization signal blocks (SSBs), other elements. In 5G NR, the global frequency raster is defined for all frequencies from 0 GHz to 100 GHz. The granularity of the global frequency raster, $\Delta F_{Global}$, defines the frequency step size between the RF reference frequencies.

In 5G NR, the RF reference frequencies are designated by an NR Absolute Radio Frequency Channel Number (NR-ARFCN), $N_{REF}$. The NR-ARFCN may be in the range (0, 1, . . . , 2016666) on the global frequency raster. The NR-ARFCN can be used to determine an associated RF reference frequency in MHz. For example, $F_{REF}=F_{REF\text{-}Offs}+\Delta F_{Global}(N_{REF}-N_{REF\text{-}Offs})$, where $F_{REF\text{-}Offs}$ and $N_{Ref\text{-}Offs}$ are offset values.

The values of the global frequency raster granularity, $\Delta F_{Global}$, the ranges of NR-ARFCNs, $N_{REF}$, and the offset values $F_{REF\text{-}Offs}$ and $N_{Ref\text{-}Offs}$ may be configured, or pre-configured (e.g., specified in a 3GPP technical standard) for different frequency ranges. In 5G NR, for example, the frequency range 0 MHz-3000 MHz may use a global frequency raster granularity $\Delta F_{Global}$=5 KHz, a ranges of NR-ARFCNs $N_{REF}$=0–599999, $F_{REF\text{-}Offs}$=0 MHz, and $N_{Ref\text{-}Offs}$=0 MHz.

Figure 6:
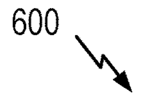
FIG. 6 depicts a table with NR operating bands mapped to RF reference frequency ranges and channel raster granularities.
Figure 7:
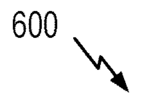
FIG. 7 depicts a table with NR operating bands mapped to RF reference frequency ranges and channel raster granularities.

The channel raster defines a subset of the RF reference frequencies that can be used to identify the RF channel position in the uplink and downlink. Each subset of RF reference frequencies are associated with different operating bands. The RF reference frequency for an RF channel maps to a resource element on the carrier. For each operating band, a subset of frequencies from the global frequency raster are applicable for that band and forms a channel raster with a granularity $\Delta F_{Raster}$, which may be equal to or larger than $\Delta F_{Global}$. FIG. 6 and FIG. 7 a depict table 600 with NR operating bands mapped to RF reference frequency ranges and 100 kHz channel raster granularities. As shown in the table 600, with the 100 kHz channel raster, every twentieth (20th) NR-ARFCN within the range of NR-ARFCNs associated with the operating band are applicable for the channel raster.

With the channel raster, a corresponding RB number and RE index can be mapped, which can be a candidate location for a channel center. The physical RB number, $n_{PRB}$, is half of the total number of RBs, $N_{RB}$, of the channel bandwidth, given as $n_{PRB}=\lfloor N\_RB/2 \rfloor$. The RE index depends on whether the total number of RBs is even or odd. For example, for $N_{RB}$ mod 2=0, the RE element index k=0 (e.g., the edge of the physical RB) and for $N_{RB}$ mod 2=1, the RE element index k=6 (e.g., the center of the physical RB). The, RF reference frequency, the RE, and/or the physical RB can be signaled, for example in radio resource control (RRC) signaling, to a UE to indicate a channel center location.

Because the channel raster to RE mapping differs depending on whether the total number of RBs is odd or even, channels with different channel BWs cannot be placed on the same raster position. In fact, the different channels cannot be placed within each other at all (e.g., cannot overlap) for the channel raster with the channel raster granularity of 100 kHz because the RBs of the different channels cannot be aligned, as discussed below with respect to FIG. 8.

Figure 8:
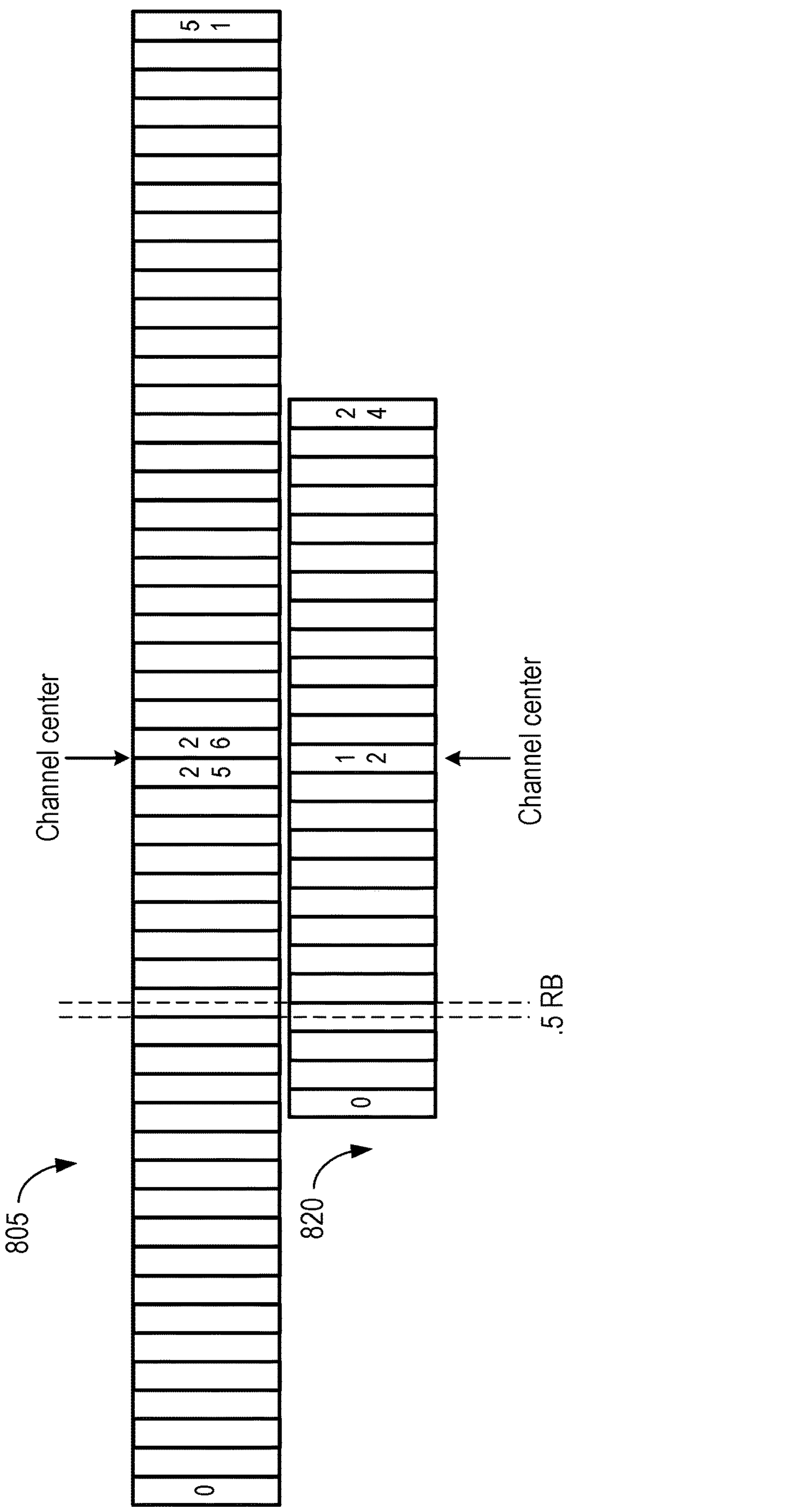
FIG. 8 depicts two different channel bandwidths in overlapping frequency spectrum with misaligned RB edges.

FIG. 8 depicts a 5 MHz channel bandwidth 820 placed within a 10 MHz channel bandwidth 805 with misaligned RB edges. Referring back to FIG. 5, and as shown in FIG. 8, the 10 MHz channel bandwidth 805 at the 15 kHz SCS has 52 total number of RBs and the 5 MHz channel bandwidth 820 at the 15 kHz SCS has 25 total number of RBs. According, the channel center for the 10 MHz channel bandwidth 805 is at the RE 0 between the physical RB numbers 25 and 26 and RE 0 and the channel center for the 5 MHz channel bandwidth 820 is at the RE 6 in the physical RB 12. Accordingly, there is a one-half RB misalignment between the 10 MHz channel bandwidth 805 and the 5 MHz channel bandwidth 820. With the 100 kHz channel raster granularity, the channel bandwidth cannot be shifted by any multiple of the channel raster granularity that will align the RB edges. Accordingly, the 5 MHz channel bandwidth 820 cannot be placed within the 10 MHz channel bandwidth 805. Therefore, the spectral efficiency is limited.

According to aspects of the present disclosure, a channel raster design is provided that allows different channel bandwidths, with even and odd total number of RBs, to be placed within each other while still having the RB edges aligned. In some aspects, a larger granularity channel raster is used instead of the 100 kHz channel raster. For example, a 5 kHz, 10 kHz, or 50 kHz channel raster granularity may be used. In some aspects, the larger granularity channel raster is used for the 5G NR operating bands shown in the table 600.

In some aspects, the network can place different channel bandwidth channel centers at multiples of the channel raster granularity that align the RB boundaries of the different channel bandwidths. In some examples, the network places the channels centers at an offset of a multiple of 2.5 RBs, or at multiples of 2.5 RBs plus or minus N×5 RBs, where N=0, 1, 2, . . . ).

Figure 9:
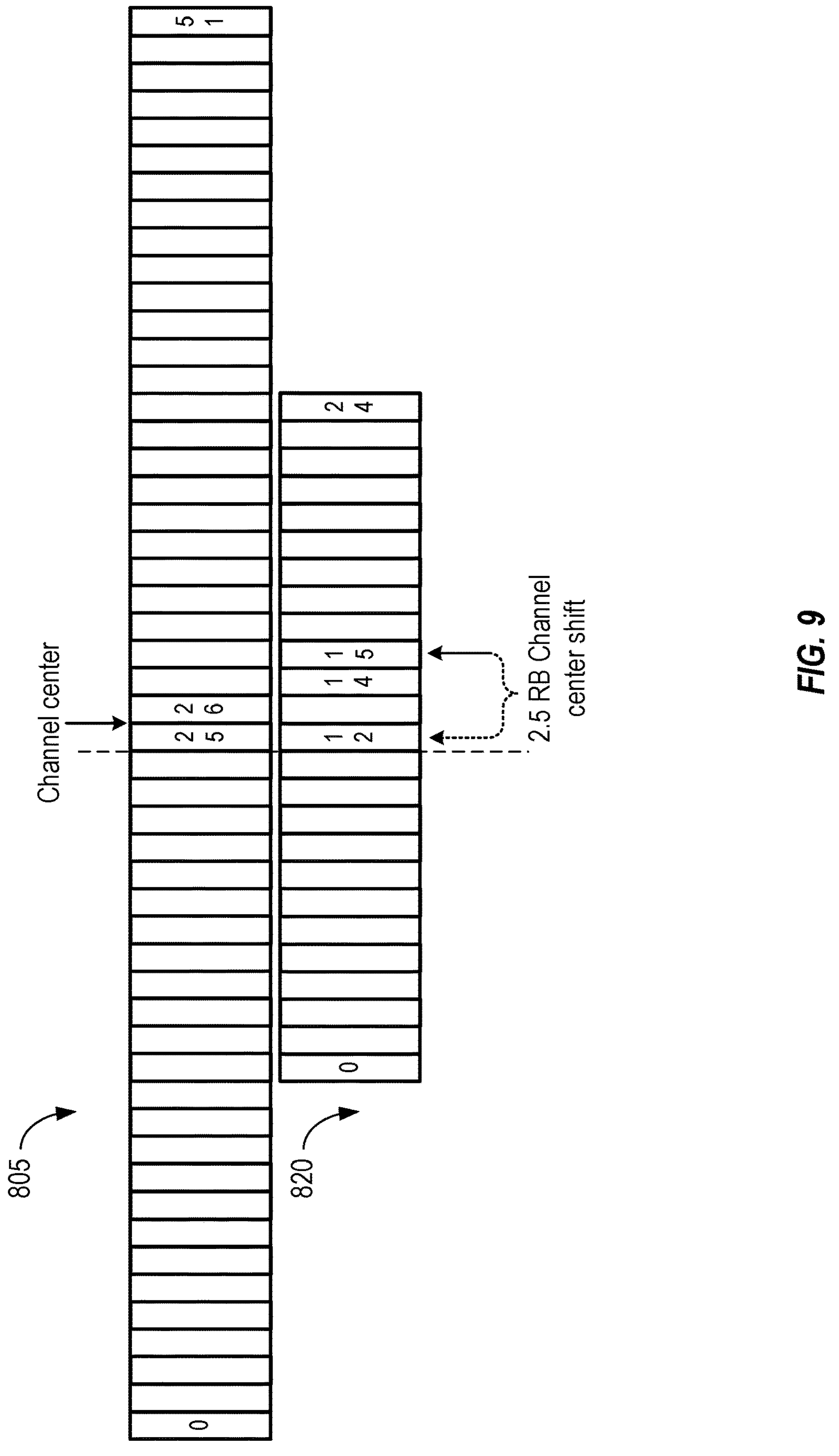
FIG. 9 depicts two different channel bandwidths in overlapping frequency spectrum with aligned RB edges and offset channel centers.

As shown in FIG. 9, with a 50 kHz channel raster granularity, the channel center of 5 MHz channel bandwidth 820 can be shifted by 450 kHz (e.g., 2.5 RBs with 15 kHz SCS and 12 subcarriers per RB), which is a multiple of the 50 kHz channel raster granularity, allowing the 5 MHz channel bandwidth 820 to be placed within the 10 MHz channel bandwidth 805, where the RBs are aligned. Thereby, the spectral efficiency can be increased.

The network can then send an indication of the channel positions to one or more UEs. In some aspects, the network broadcasts the channel positions in common signaling. In some aspects, the network sends dedicated RRC signaling to a UE indicating a channel position. In one examples, the network may broadcast a first channel bandwidth and location that UEs can use to connect to the network. Once connected to a UE, the network can send dedicated RRC to the UE with a second channel bandwidth and location to use for uplink and/or downlink communications with the UE.

Aspects Related to Synchronization Raster and to Channel Raster Selection

The synchronization raster defines frequency positions on which a SSB can be placed (e.g., transmitted). The SSBs may be used by UEs for system acquisition when explicit signaling of the SSB position is not present (e.g., via blind detection at the synchronization raster positions).

The global frequency channel raster defines the set of RF reference frequencies, $F_{REF}$, with the global frequency raster granularity, $\Delta F_{Global}$, frequency step size (e.g., 5 kHz) between the RF reference frequencies.

Figure 10:
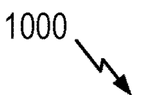
FIG. 10 depicts a table with synchronization raster positions for different frequency ranges.

The synchronization raster defines a subset of the RF reference frequencies that can be used for the SSB, $SS_{REF}$ Each SSB frequency position, SS REF, is associated with a corresponding Global Synchronization Channel Number (GSCN). The SSB frequencies positions, $SS_{REF}$, are defined by the granularity of the synchronization raster (i.e., the frequency step size between each $SS_{REF}$). For example, the granularity of the synchronization raster may be 1200 kHz in FR1 (the 0-3000 MHz frequency range), as shown in the table 1000 depicted in FIG. 10. Additionally, three frequency offsets (e.g., 5 kHz offsets) may be used to cover the three different subcarrier positions (e.g., multiples of 15 kHz), as shown in FIG. 10. The resource element index, k, corresponding to the subcarrier number of each $SS_{REF}$ may be defined (e.g., k=120).

Figure 11:
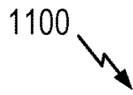
FIG. 11 depicts a table with NR operating bands mapped to synchronization raster position ranges and numerology.
Figure 12:
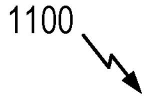
FIG. 12 depicts a table with NR operating bands mapped to synchronization raster position ranges and numerology.

The synchronization raster and the SCS of the SSB is defined separately for each band. FIGS. 11-12 depict a table 1100 showing example SSB SCS and example corresponding ranges of GSCN for the synchronization raster for the example NR operating bands associated with the 100 kHz channel raster depicted in FIGS. 6-7. The synchronization raster was designed such that the synchronization raster covers any channel that is on the 100 kHz channel raster. However, if a different channel raster is used, such as the 50 kHz, 10 kHz, or 5 kHz channel raster described herein, then the synchronization raster may not cover some channels as illustrated in FIG. 13.

Figure 13:
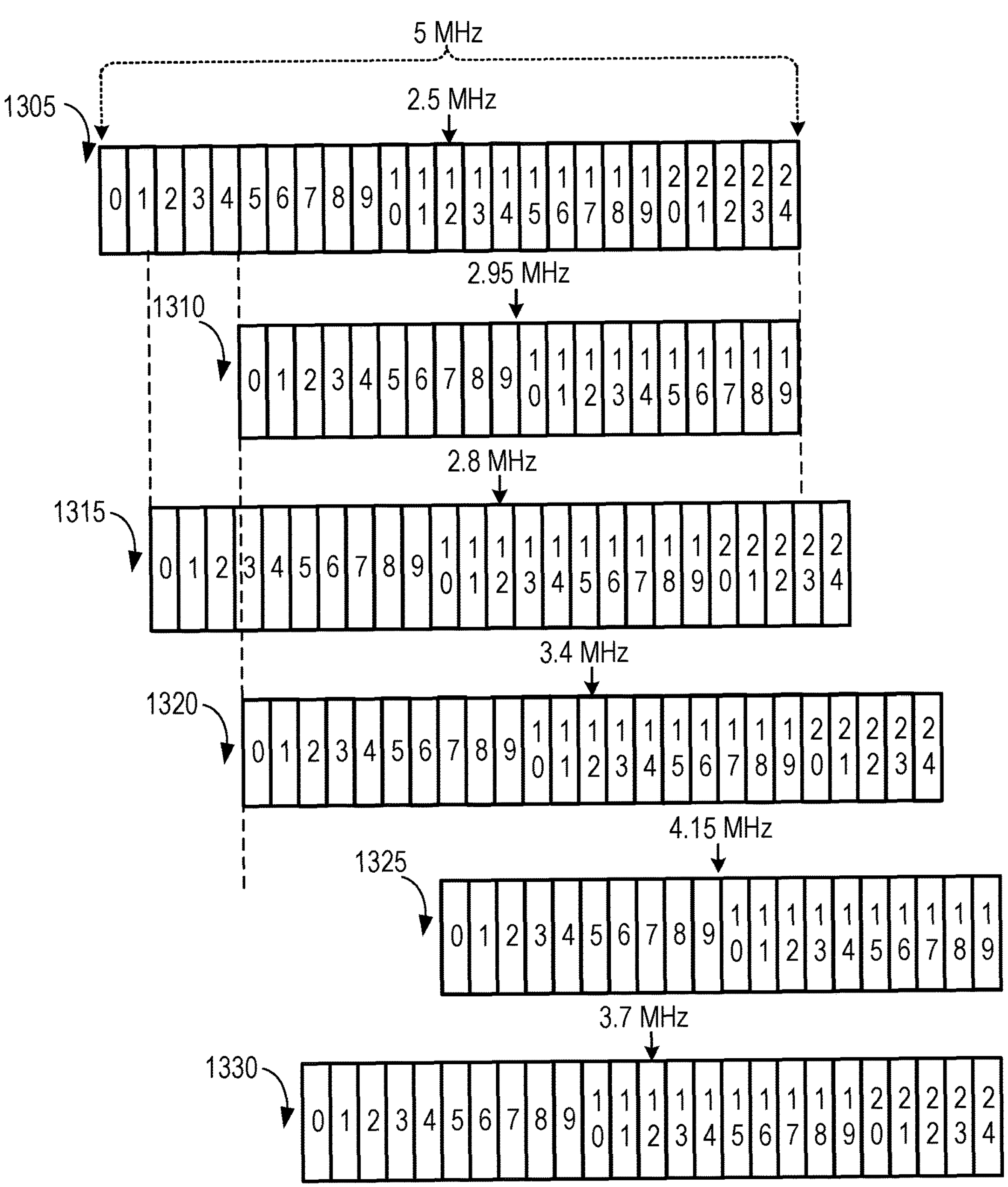
FIG. 13 depicts different channel bandwidths in overlapping frequency spectrum based on a sub-100 kHz channel raster granularity channel raster and the synchronization raster.

As shown in FIG. 13, in an illustrative example, the 5 MHz channel bandwidth 1305 with the 15 kHz SCS has the channel center at the RE 6 in the PRB (physical RB) 12. A channel bandwidth 1315 that may be placed on the same raster (e.g., the same FFT raster with subcarrier alignment), is 300 kHz from the previous channel bandwidth 1305 based on the SCS and the channel raster granularity (300 kHz is the next multiple of both 15 kHz and 100 kHz). As shown, an SSB 1310 may fit, and can be placed, within both the channel bandwidth 1305 and the channel bandwidth 1315. For example, the SSB 1310 may be aligned with the end of the 5 MHz channel, covering the twenty RBs from the end of the 5 MHz channel, having a center at 2.95 MHz as shown in FIG. 13. Another channel bandwidth 1320 may be aligned with the channel bandwidth 1305 and/or the channel bandwidth 1315, that also fits the SSB 1310 by aligning with the beginning of the SSB 1310, where the SSB 1310 covers the twenty RBs from the beginning of the channel bandwidth 1320, as shown in FIG. 13 and with the channel center at 3.4 MHz.

Accordingly, 900 MHz channel raster frequency resources, between the channel bandwidth 1305 and the channel bandwidth 1320 can be used fit an SSB 1310 in the same synchronization raster frequency location. In the example illustrated in FIG. 13, the next synchronization raster frequency location occurs at 4.15 MHz, that is, 1.2 MHz from the SSB 1310 at 2.95 MHz, at which an SSB 1325 may be placed. The SSB 1310 may fit within a channel bandwidth 1330 aligned with the end of the SSB 1325 as shown in FIG. 13.

Figure 14:
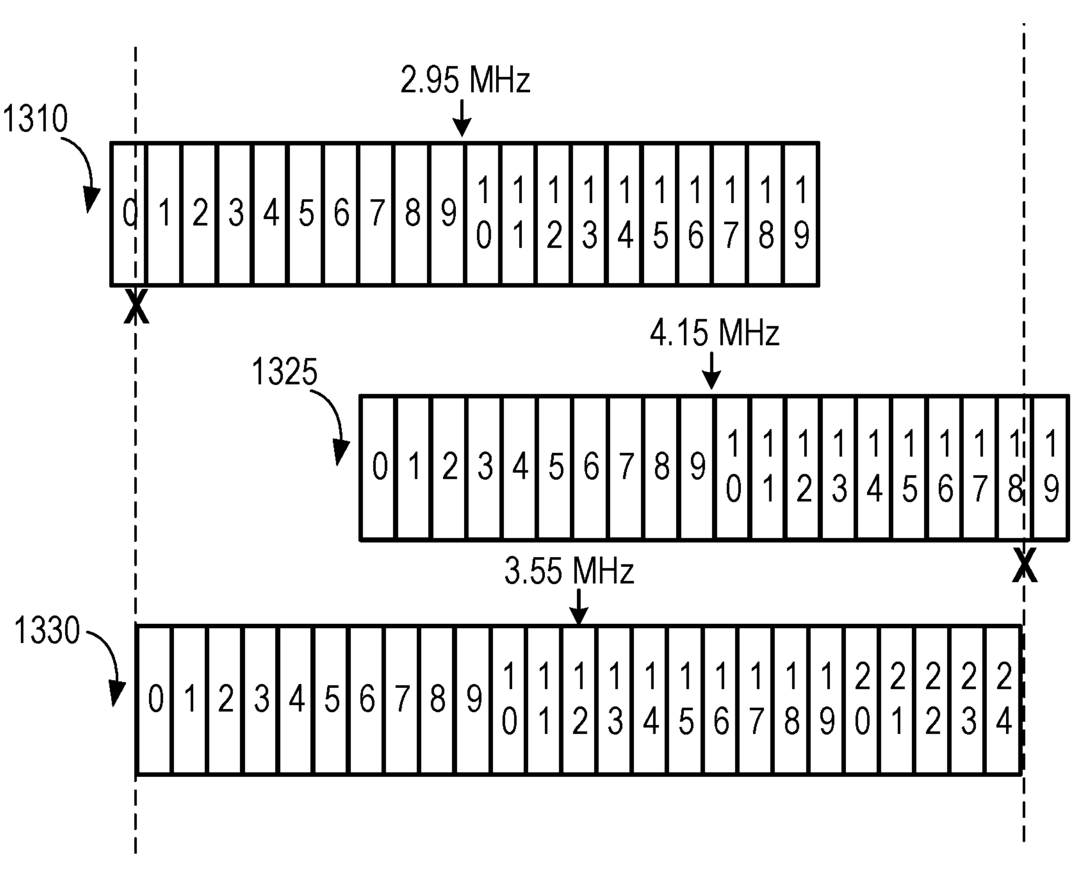
FIG. 14 depicts a frequency spectrum coverage gap of the synchronization raster based on the sub-100 kHz channel raster granularity channel raster.

The channels not covered by the synchronization raster would be the channels with centers between channel raster entries in the 300 kHz between +450 kHz and the next channel raster position −450 kHz. For example, as shown in the example illustrated in FIG. 13, the 300 kHz between the channel raster entries at 3.4 MHz and 3.7 MHz are not covered. If a channel is placed in that position (in the 300 kHz), then there is no place to position an SSB within that channel. For example, if the channel bandwidth 1330 is placed at 3.55 MHz, as shown in FIG. 14, neither the SSB 1310 nor the SSB 1325 fits within the channel bandwidth 1330.

According to certain aspects, when a channel bandwidth is positioned on the finer granularity channel raster (e.g., 50 kHz, 10 kHz, 5 kHz channel raster) then the channel is positioned such that the center is within the coverage a synchronization raster entry. In some examples, the channel bandwidth is placed within 450 kHz (+450 kHz or −450 kHz) of a synchronization raster entry. In some aspects, the difference between the channel raster entry and synchronization raster is a multiple of the SCS (e.g., 15 kHz) such that the channel and SSB are on the same FFT grid (e.g., such that the subcarriers are positioned on the same multiple of 15 kHz).

In some aspects, a narrower channel bandwidth is placed at a finer granularity channel raster position within a wider channel bandwidth (e.g., 5 MHz channel within 10 MHz channel). In some aspects, a winder channel bandwidth is placed at a finer granularity channel raster position on top of a narrower channel bandwidth (e.g., 5 MHz channel within 10 MHz channel), such that the channel center is within the coverage (e.g., within 450 kHz) of the synchronization raster.

According certain aspects, when a single channel is deployed, then the channel should be deployed on the "legacy" 100 kHz channel raster.

According to certain aspects, a network entity (e.g., a BS 102) configures a UE 104 with the channel raster, channel raster granularity, synchronization raster, synchronization raster granularity, and/or any of the other parameters discussed herein. In some aspects, the network entity configures the UE with the channel positions and/or SSB positions. In some aspects, the configuration is via RRC signaling or system information signaling (e.g., in a SIB).

Example Operations of Entities in a Communications Network

Figure 15:
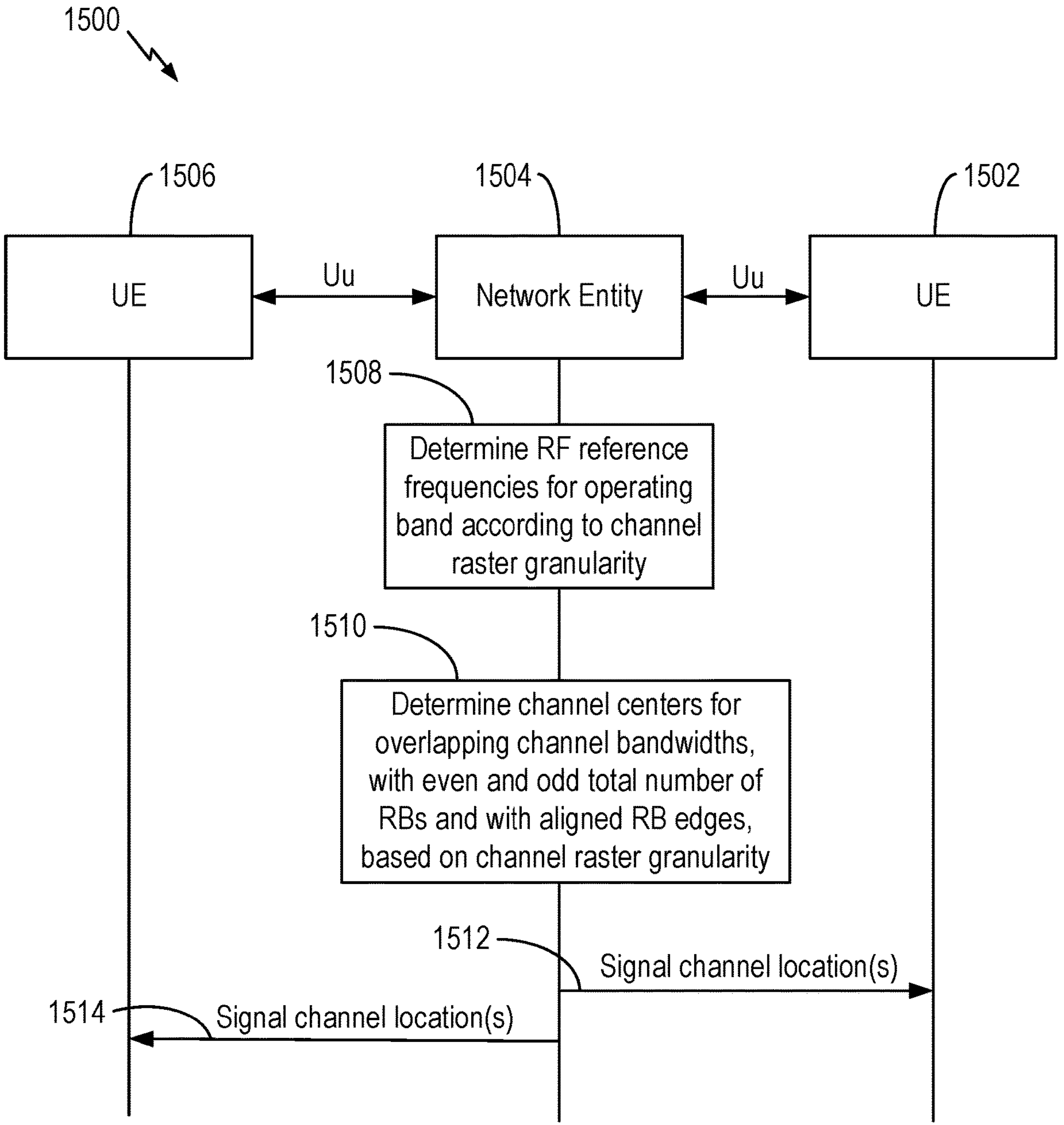
FIG. 15 depicts a process flow for communications in a network between a network entity and one or more user equipments.

FIG. 15 depicts a process flow 1500 for communications in a network between a network entity 1504, a first user equipment (UE) 1502, and a second UE 1506. In some aspects, the network entity 1504 may be an example of the BS 102 depicted and described with respect to FIGS. 1 and 3 or a disaggregated BS depicted and described with respect to FIG. 2. Similarly, the first UE 1502 and the second UE 1506 may be an example UEs 104 depicted and described with respect to FIGS. 1 and 3. However, in other aspects, the first UE 1502 and second UE 1506 may be another type of wireless communications device and network entity 1504 may be another type of network entity or network node, such as those described herein.

As shown in the process flow 1500, at operation 1508, the network entity 1504 determines radio frequency (RF) reference frequencies for an operating band according to a channel raster granularity. In some aspects, the network entity 1504 determines the RF reference frequencies, at operation 1508, according to configured or preconfigured information. In some aspects, the network entity 1504 determines the RF reference frequencies, at operation 1508, based on the frequency range and the operating band. In some aspects, the RF reference frequencies for the operating band are specified in a 3GPP technical standard for the new radio (NR) operating band, and the network entity 1504 may be configured to operate according to the 3GPP technical standard. As discussed herein, the channel raster granularity may be 5 kHz, 10 kHz, or 50 kHz.

As shown in the process flow 1500, at operation 1510, the network entity 1504 determines channel centers for overlapping channel bandwidths with even and odd total numbers of resource blocks (RBs) and with aligned RB edges, based on the channel raster granularity.

In some aspects, the network entity 1504 determines the total number of RBs for the different channel bandwidths based on a configured subcarrier spacing (SCS), a number of subcarriers per RB, and the channel bandwidth. In some aspects, the network entity 1504 determines the total number of RBs for the different channel bandwidths, at operation 1510, according to configured or preconfigured information. In some aspects, the total number of RBs for the different channel bandwidths are specified in the 3GPP technical standard, and the network entity 1504 may be configured to operate according to the 3GPP technical standard.

In some aspects, the network entity 1504 determines a channel center for the different channel bandwidths based on whether the total number of RBs for the different channel bandwidths is an even or odd number. For example, the network entity 1504 determines a physical resource block at the center of the total number of RBs and a zeroth resource element (RE) if the total number of RBs is even or a center (or sixth) RE if the total number of RBs is odd.

In some aspects, the network entity 1504 determines the channel centers, at operation 1510, based on shifting the channel center for one of the channel bandwidths by a multiple of the channel raster granularity, such that the RB edges of the different overlapping channel bandwidths are aligned.

In some aspects, the network entity 1504 determines the channel centers, at operation 1510, based on the synchronization raster. In some aspects, the network entity 1504 determines the channel center for then channel, when the channel uses a channel raster granularity different than 100 kHz channel raster granularity, that is within 450 kHz of a synchronization raster frequency location. In some aspects, the network entity 1504 determines the channel center for the channel that is at a multiple of the SCS.

As shown in the process flow 1500, at operation 1512, the network entity 1504 signals channel location(s) to the first UE 1502 and, at operation 1514, signals channel location(s) to the second UE 1506. For example, the network entity 1504 may signal the channel location with the first channel bandwidth to the first UE 1502 and signal the channel location with the second channel bandwidth to the second UE 1506. In some aspects, the network entity 1504 signals the first UE 1502 or the second UE 1506 at operation 1512 or operation 1514, respectively, via the radio resource control (RRC) signaling, broadcast signaling, or both RRC signaling and broadcast signaling.

Example Operations of a Network Entity

Figure 16:
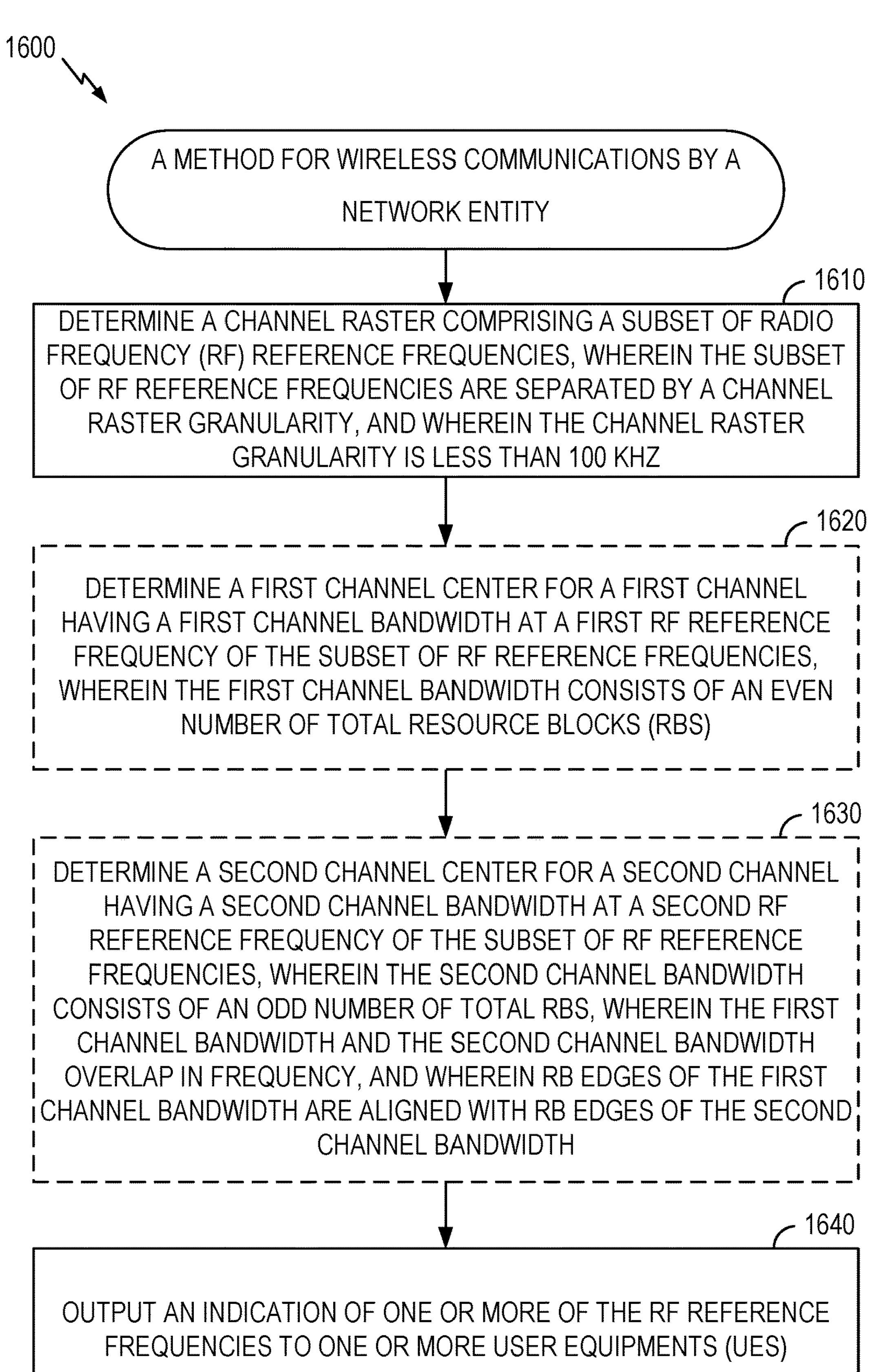
FIG. 16 depicts a method for wireless communications by a network entity.

FIG. 16 shows a method 1600 for wireless communications by a network entity, such as a base station (BS) 102 of FIGS. 1 and 3, or a disaggregated BS as discussed with respect to FIG. 2.

Method 1600 begins at operation 1610 with determining a channel raster comprising a subset of radio frequency (RF) reference frequencies. The subset of RF reference frequencies are separated by a channel raster granularity. According to certain aspects, the channel raster granularity is less than 100 kHz.

Optionally, method 1600 then proceeds to operation 1620 with determining a first channel center for a first channel having a first channel bandwidth at a first RF reference frequency of the subset of RF reference frequencies. The first channel bandwidth consists of an even number of total resource blocks (RBs).

Optionally, method 1600 then proceeds to operation 1630 with determining a second channel center for a second channel having a second channel bandwidth, different than the first channel bandwidth, at a second RF reference frequency. The second channel bandwidth consists of an odd number of total RBs. The first channel bandwidth and the second channel bandwidth overlap in frequency. RB edges of the first channel are aligned with RB edges of the second channel.

In one aspect, determining the first channel center at operation 1620, the second channel center at operation 1630, or both, is based on a synchronization raster, a SCS, and whether the channel center is placed at a channel raster location different than the 100 kHz channel raster.

In one aspect, determining the first channel center at operation 1620, the second channel center at operation 1630, or both, includes placing the channel center at a channel raster entry within 450 kHz of a synchronization raster entry when the channel center is placed at a channel raster location different than the 100 kHz channel raster. In one aspect, determining the first channel center at operation 1620, the second channel center at operation 1630, or both, includes placing the channel center at a frequency location that is a multiple of the SCS.

Method 1600 then proceeds to operation 1640 with outputting an indication of one or more of the RF reference frequencies to one or more user equipments (UEs). According to certain aspects, the network entity outputs the RF reference frequencies for the first channel center, the second channel center, or both to the one or more UEs.

In one aspect, the channel raster granularity is 5 kHz, 10 kHz, or 50 kHz.

In one aspect, the first channel center is located at a first resource element (RE) at an edge of a first center RB of the total RBs of the first channel bandwidth and the second channel center is located at a second RE at a center of a second center RB of the total RBs of the second channel bandwidth.

In one aspect, the first channel center is offset from the second channel center.

In one aspect, the first channel center is offset from the second channel center by a multiple of the channel raster granularity.

In one aspect, outputting the indication, at operation 1640, of the first channel center, the second channel center, or both includes outputting the RF reference frequency for transmission to the one or more UEs in broadcast signaling, dedicated radio resource control (RRC) signaling, or a combination thereof.

In one aspect, outputting the indication, at operation 1640, broadcasting a common configuration to the one or more UEs with an indication of one of the first channel center or the second channel center, where the common configuration is used by a first UE of the one or more UEs to connect to the network entity; and transmitting dedicated RRC signaling to the first UE with an indication of the other one of the first channel center or the second channel center, where the dedicated RRC signaling is used by the first UE to communicate with the network entity after connecting.

In one aspect, the subset RF reference frequencies comprise a subset of all RF reference frequencies in a global raster having a global raster granularity.

In one aspect, the global raster granularity depends on a frequency range (FR), and the FR includes frequencies at or below 3000 MHz.

In one aspect, the RF reference frequencies in the global raster are each associated with a new radio (NR) absolute radio frequency channel number (NR-ARFCN), and the subset of RF reference frequencies includes RF reference frequencies separated by the channel raster granularity within a first range of RF reference frequencies for uplink and a second range of RF reference frequencies for downlink.

In one aspect, the range of RF reference frequencies and the channel raster granularity are associated with an operating band of a plurality of operating bands, and each of the plurality of operating bands are associated with a different range of RF reference frequencies and the same channel raster granularity.

In one aspect, the plurality of operating bands includes one or more of NR operating bands n1, n2, n3, n5, n7, n8, n12, n13, n14, n18, n20, n24, n25, n26, n28, n29, n30, n34, n38, n39, n40, n50, n51, n53, n65, n66, n67, n70, n71, n74, n75, n76, n80, n81, n82, n83, n84, n85, n86, n89, n90, n91, n92, n93, n94, n95, n97, n98, n99, n100, or n101.

In one aspect, the channel raster granularity is associated with long term evolution (LTE) refarming operating bands.

In one aspect, outputting the indication of the first channel center, the second channel center, or both to the one or more user UEs comprises outputting an indication of the first channel center to a first UE and the second channel center to a second UE.

In one aspect, method 1600, or any aspect related to it, may be performed by an apparatus, such as communications device 1300 of FIG. 13, which includes various components operable, configured, or adapted to perform the method 1600. Communications device 1300 is described below in further detail.

Note that FIG. 16 is just one example of a method, and other methods including fewer, additional, or alternative steps are possible consistent with this disclosure.

Example Operations of a User Equipment

Figure 17:
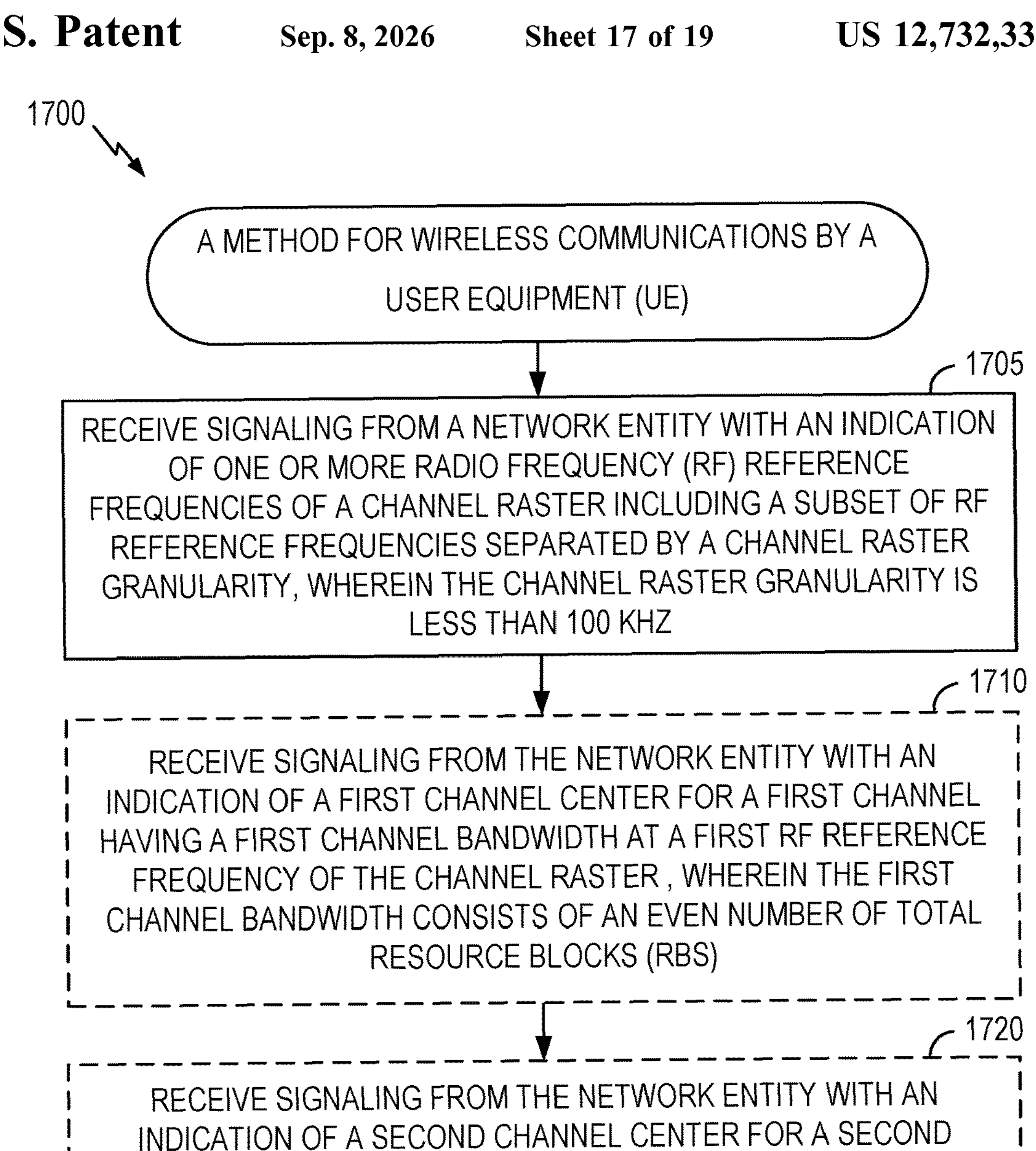
FIG. 17 depicts a method for wireless communications by a user equipment.

FIG. 17 shows a method 1700 for wireless communications by a UE, such as UE 104 of FIGS. 1 and 3.

Method 1700 begins at operation 1705 with receiving signaling from a network entity with an indication of one or more radio frequency (RF) reference frequency of a channel raster including a subset of RF reference frequencies separated by a channel raster granularity. According to certain aspects, the channel raster granularity is less than 100 kHz.

Optionally, method 1700 includes operation 1710 with receiving signaling from the network entity with an indication of a first channel center for a first channel having a first channel bandwidth at a first RF reference frequency of the channel raster. The first channel bandwidth consists of an even number of total resource blocks (RBs);

Optionally, method 1700 includes proceeds to operation 1720 with receiving signaling from the network entity with an indication of a second channel center for a second channel having a second channel bandwidth at a second RF reference frequency of the subset of RF reference frequencies. The second channel bandwidth consists of an odd number of total RB s. The first channel bandwidth and the second channel bandwidth overlap in frequency. RB edges of the first channel bandwidth are aligned with RB edges of the second channel bandwidth.

Method 1700 then proceeds to operation 1730 with communicating with the network entity using at least one of the one or more RF reference frequencies.

In one aspect, the channel raster granularity is 5 kHz, 10 kHz, or 50 kHz.

In one aspect, the first channel center is located at a first resource element (RE) at an edge of a first center RB of the total RBs of the first channel bandwidth, and wherein the second channel center is located at a second RE at a center of a second center RB of the total RBs of the second channel bandwidth.

In one aspect, the first channel center is offset from the second channel center.

In one aspect, the first channel center is offset from the second channel center by a multiple of the channel raster granularity.

In one aspect, receiving the indication of the first channel center at operation 1710, the second channel center at operation 1720, or both, is via broadcast signaling, dedicated radio resource control (RRC) signaling, or a combination thereof.

In one aspect, receiving the indication of the first channel center at operation 1710, the second channel center at operation 1720, or both includes receiving a broadcast common configuration with an indication of one of the first channel center or the second channel center, where the common configuration is used by the UE to connect to the network entity; and receiving dedicated RRC signaling with an indication of the other one of the first channel center or the second channel center, where the dedicated RRC signaling is used by the UE to communicate with the network entity after connecting.

In one aspect, the subset RF reference frequencies comprise a subset of all RF reference frequencies in a global raster having a global raster granularity.

In one aspect, the global raster granularity depends on a frequency range (FR), and wherein the FR comprises frequencies at or below 3000 MHz.

In one aspect, the RF reference frequencies in the global raster are each associated with a new radio (NR) absolute radio frequency channel number (NR-ARFCN), and wherein the subset of RF reference frequencies comprises RF reference frequencies separated by the channel raster granularity within a first range of RF reference frequencies for uplink and a second range of RF reference frequencies for downlink.

In one aspect, the range of RF reference frequencies and the channel raster granularity are associated with an operating band of a plurality of operating bands, and wherein each of the plurality of operating bands are associated with a different range of RF reference frequencies and the same channel raster granularity.

In one aspect, the plurality of operating bands comprise one or more of NR operating bands n1, n2, n3, n5, n7, n8, n12, n13, n14, n18, n20, n24, n25, n26, n28, n29, n30, n34, n38, n39, n40, n50, n51, n53, n65, n66, n67, n70, n71, n74, n75, n76, n80, n81, n82, n83, n84, n85, n86, n89, n90, n91, n92, n93, n94, n95, n97, n98, n99, n100, or n101.

In one aspect, the channel raster granularity is associated with long term evolution (LTE) refarming operating bands.

In one aspect, method 1700, or any aspect related to it, may be performed by an apparatus, such as communications device 1400 of FIG. 14, which includes various components operable, configured, or adapted to perform the method 1700. Communications device 1400 is described below in further detail.

Note that FIG. 17 is just one example of a method, and other methods including fewer, additional, or alternative steps are possible consistent with this disclosure.

Example Communications Devices

Figure 18:
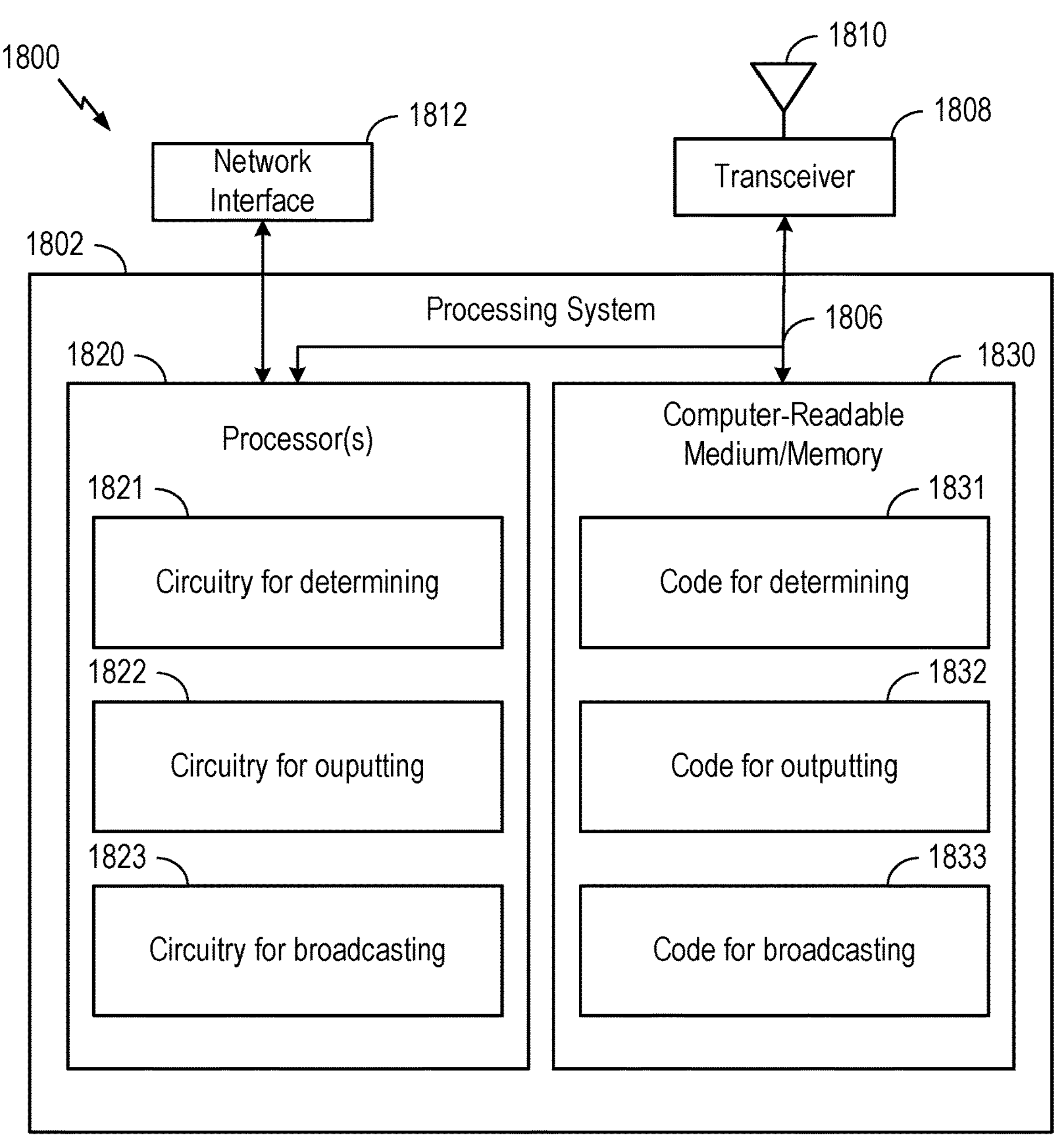
FIG. 18 depicts aspects of an example communications device.

FIG. 18 depicts aspects of an example communications device. In some aspects, communications device 1800 is a network entity, such as BS 102 of FIGS. 1 and 3, or a disaggregated base station as discussed with respect to FIG. 2.

The communications device 1800 includes a processing system 1802 coupled to a transceiver 1808 (e.g., a transmitter and/or a receiver) and/or a network interface 1812. The transceiver 1808 is configured to transmit and receive signals for the communications device 1800 via an antenna 1810, such as the various signals as described herein. The network interface 1812 is configured to obtain and send signals for the communications device 1800 via communications link(s), such as a backhaul link, midhaul link, and/or fronthaul link as described herein, such as with respect to FIG. 2. The processing system 1802 may be configured to perform processing functions for the communications device 1800, including processing signals received and/or to be transmitted by the communications device 1800.

The processing system 1802 includes one or more processors 1820. In various aspects, one or more processors 1820 may be representative of one or more of receive processor 338, transmit processor 320, TX MIMO processor 330, and/or controller/processor 340, as described with respect to FIG. 3. The one or more processors 1820 are coupled to a computer-readable medium/memory 1830 via a bus 1806. In certain aspects, the computer-readable medium/memory 1830 is configured to store instructions (e.g., computer-executable code) that when executed by the one or more processors 1820, cause the one or more processors 1820 to perform the method 1600 described with respect to FIG. 16, or any aspect related to it. Note that reference to a processor of communications device 1800 performing a function may include one or more processors of communications device 1800 performing that function.

In the depicted example, the computer-readable medium/memory 1830 stores code (e.g., executable instructions) for determining 1831, code for outputting 1832, and code for broadcasting 1833. Processing of the code 1831-1833 may cause the communications device 1800 to perform the method 1600 described with respect to FIG. 16, or any aspect related to it.

The one or more processors 1820 include circuitry configured to implement (e.g., execute) the code stored in the computer-readable medium/memory 1830, including circuitry for determining 1821, circuitry for outputting 1822, and circuitry for broadcasting 1823. Processing with circuitry 1821-1823 may cause the communications device 1800 to perform the method 1600 as described with respect to FIG. 16, or any aspect related to it.

Various components of the communications device 1800 may provide means for performing the method 1600 as described with respect to FIG. 16, or any aspect related to it. Means for transmitting, sending or outputting for transmission may include the transceivers 332 and/or antenna(s) 334 of the BS 102 illustrated in FIG. 3 and/or transceiver 1808 and antenna 1810 of the communications device 1800 in FIG. 18. Means for receiving or obtaining may include the transceivers 332 and/or antenna(s) 334 of the BS 102 illustrated in FIG. 3 and/or transceiver 1808 and antenna 1810 of the communications device 1800 in FIG. 18.

Figure 19:
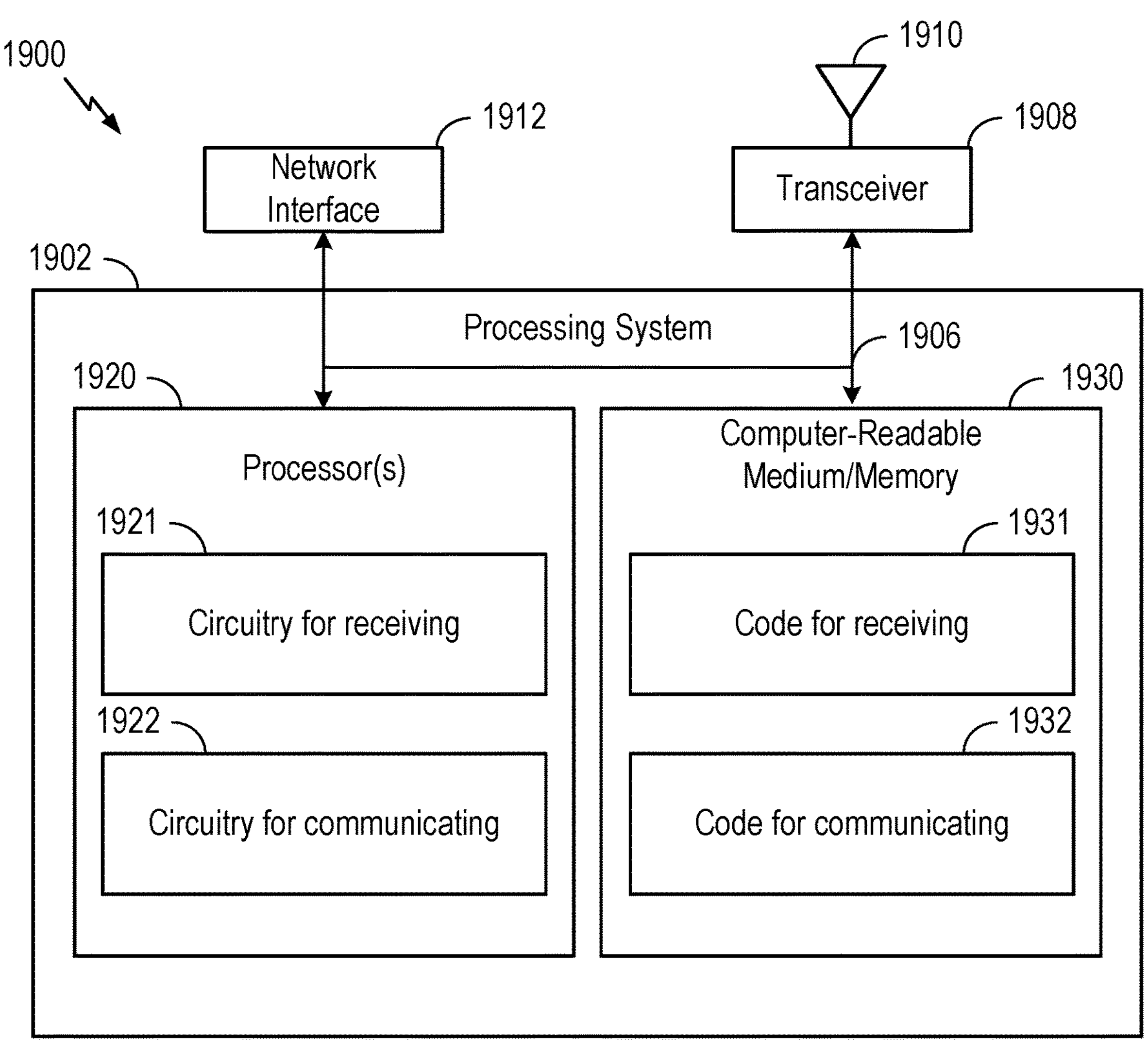
FIG. 19 depicts aspects of an example communications device.

FIG. 19 depicts aspects of an example communications device 1900. In some aspects, communications device 1900 is a user equipment, such as UE 104 described above with respect to FIGS. 1 and 3.

The communications device 1900 includes a processing system 1902 coupled to a transceiver 1908 (e.g., a transmitter and/or a receiver). The transceiver 1908 is configured to transmit and receive signals for the communications device 1900 via an antenna 1910, such as the various signals as described herein. The processing system 1902 may be configured to perform processing functions for the communications device 1900, including processing signals received and/or to be transmitted by the communications device 1900.

The processing system 1902 includes one or more processors 1920. In various aspects, the one or more processors 1920 may be representative of one or more of receive processor 358, transmit processor 364, TX MIMO processor 366, and/or controller/processor 380, as described with respect to FIG. 3. The one or more processors 1920 are coupled to a computer-readable medium/memory 1930 via a bus 1906. In certain aspects, the computer-readable medium/memory 1930 is configured to store instructions (e.g., computer-executable code) that when executed by the one or more processors 1920, cause the one or more processors 1920 to perform the method 1600 described with respect to FIG. 16, or any aspect related to it. Note that reference to a processor performing a function of communications device 1900 may include one or more processors performing that function of communications device 1900.

In the depicted example, computer-readable medium/memory 1930 stores code (e.g., executable instructions) for receiving 1931 and code for communicating. Processing of the code 1931-1932 may cause the communications device 1900 to perform the method 1700 described with respect to FIG. 17, or any aspect related to it.

The one or more processors 1920 include circuitry configured to implement (e.g., execute) the code stored in the computer-readable medium/memory 1930, including circuitry for receiving 1921 and circuitry for communicating 1922. Processing with circuitry 1921-1922 may cause the communications device 1900 to perform the method 1700 described with respect to FIG. 17, or any aspect related to it.

Various components of the communications device 1900 may provide means for performing the method 1700 described with respect to FIG. 17, or any aspect related to it. For example, means for transmitting, sending or outputting for transmission may include the transceivers 354 and/or antenna(s) 352 of the UE 104 illustrated in FIG. 3 and/or transceiver 1908 and antenna 1910 of the communications device 1900 in FIG. 19. Means for receiving or obtaining may include the transceivers 354 and/or antenna(s) 352 of the UE 104 illustrated in FIG. 3 and/or transceiver 1908 and antenna 1910 of the communications device 1900 in FIG. 19.

Example Clauses

Implementation examples are described in the following numbered clauses:

Clause 1: A method for wireless communications by a network entity, the method comprising: determining a channel raster comprising a subset of radio frequency (RF) reference frequencies separated by a channel raster granularity; determining a first channel center for a first channel having a first channel bandwidth at a first RF reference frequency of the subset of RF reference frequencies, wherein the first channel bandwidth consists of an even number of resource blocks (RBs); determining a second channel center for a second channel having a second channel bandwidth at a second RF reference frequency of the subset of RF reference frequencies, wherein the second channel bandwidth consists of an odd number of total RBs, wherein the first channel bandwidth and the second channel bandwidth overlap in frequency, and wherein RB edges of the first channel bandwidth are aligned with RB edges of the second channel bandwidth; and outputting an indication of the first channel center, the second channel center, or both to one or more user equipments (UEs).

Clause 2: The method of Clause 1, wherein the channel raster granularity is 5 kHz, 10 kHz, or 50 kHz.

Clause 3: The method of any one or more of Clauses 1-2, wherein the first channel center is located at a first resource element (RE) at an edge of a first center RB of the RB s of the first channel bandwidth, and wherein the second channel center is located at a second RE at a center of a second center RB of the RBs of the second channel bandwidth.

Clause 4: The method of any one or more of Clauses 1-3, wherein the first channel center is offset from the second channel center.

Clause 5: The method of Clause 4, wherein the first channel center is offset from the second channel center by a multiple of the channel raster granularity.

Clause 6: The method of any one or more of Clauses 1-5, wherein outputting the indication of the first channel center, the second channel center, or both is via broadcast signaling, dedicated radio resource control (RRC) signaling, or a combination thereof.

Clause 7: The method of Clause 6, wherein outputting the indication of the first channel center, the second channel center, or both comprises: broadcasting a common configuration to the one or more UEs with an indication of one of the first channel center or the second channel center, wherein the common configuration is used by a first UE of the one or more UEs to connect to the network entity; and transmitting dedicated RRC signaling to the first UE with an indication of the other one of the first channel center or the second channel center, wherein the dedicated RRC signaling is used by the first UE to communicate with the network entity after connecting.

Clause 8: The method of any one or more of Clauses 1-7, wherein the subset RF reference frequencies comprise a subset of all RF reference frequencies in a global raster having a global raster granularity.

Clause 9: The method of Clause 8, wherein the global raster granularity depends on a frequency range (FR), and wherein the FR comprises frequencies at or below 3000 MHz.

Clause 10: The method of any one or more of Clauses 8-9, wherein the RF reference frequencies in the global raster are each associated with a new radio (NR) absolute radio frequency channel number (NR-ARFCN), and wherein the subset of RF reference frequencies comprises RF reference frequencies separated by the channel raster granularity within a first range of RF reference frequencies for uplink and a second range of RF reference frequencies for downlink.

Clause 11: The method of any one or more of Clause 10, wherein the range of RF reference frequencies and the channel raster granularity are associated with an operating band of a plurality of operating bands, and wherein each of the plurality of operating bands are associated with a different range of RF reference frequencies and the same channel raster granularity.

Clause 12: The method of Clause 11, wherein the plurality of operating bands comprise one or more of NR operating bands n1, n2, n3, n5, n7, n8, n12, n13, n14, n18, n20, n24, n25, n26, n28, n29, n30, n34, n38, n39, n40, n50, n51, n53, n65, n66, n67, n70, n71, n74, n75, n76, n80, n81, n82, n83, n84, n85, n86, n89, n90, n91, n92, n93, n94, n95, n97, n98, n99, n100, or n101.

Clause 13: The method of any one or more of Clauses 1-12, wherein the channel raster granularity is associated with long term evolution (LTE) refarming operating bands.

Clause 14: The method of any one or more of Clauses 1-13, wherein outputting the indication of the first channel center, the second channel center, or both to the one or more user UEs comprises outputting an indication of the first channel center to a first UE and the second channel center to a second UE.

Clause 15: A method for wireless communications by a user equipment (UE), the method comprising: receiving signaling from a network entity with an indication of a first channel center for a first channel having a first channel bandwidth at a first radio frequency (RF) reference frequency of a channel raster including a subset of RF reference frequencies separated by a channel raster granularity, wherein the first channel bandwidth consists of an even number of total resource blocks (RBs); receiving signaling from the network entity with an indication of a second channel center for a second channel having a second channel bandwidth at a second RF reference frequency of the subset of RF reference frequencies, wherein the second channel bandwidth consists of an odd number of total RBs, wherein the first channel bandwidth and the second channel bandwidth overlap in frequency, and wherein RB edges of the first channel bandwidth are aligned with RB edges of the second channel bandwidth; and communicating with the network entity using the first channel, the second channel, or both.

Clause 16: The method of Clause 15, wherein the channel raster granularity is 5 kHz, 10 kHz, or 50 kHz.

Clause 17: The method of any one or more of Clauses 15-16, wherein the first channel center is located at a first resource element (RE) at an edge of a first center RB of the RBs of the first channel bandwidth, and wherein the second channel center is located at a second RE at a center of a second center RB of the RBs of the second channel bandwidth.

Clause 18: The method of any one or more of Clauses 15-17, wherein the first channel center is offset from the second channel center.

Clause 19: The method of Clause 18, wherein the first channel center is offset from the second channel center by a multiple of the channel raster granularity.

Clause 20: The method of any one or more of Clauses 15-19, wherein receiving the indication of the first channel center, the second channel center, or both is via broadcast signaling, dedicated radio resource control (RRC) signaling, or a combination thereof.

Clause 21: The method of Clause 20, wherein receiving the indication of the first channel center, the second channel center, or both comprises: receiving a broadcast common configuration with an indication of one of the first channel center or the second channel center, wherein the common configuration is used by the UE to connect to the network entity; and receiving dedicated RRC signaling with an indication of the other one of the first channel center or the second channel center, wherein the dedicated RRC signaling is used by the UE to communicate with the network entity after connecting.

Clause 22: The method of any one or more of Clauses 15-21, wherein the subset RF reference frequencies comprise a subset of all RF reference frequencies in a global raster having a global raster granularity.

Clause 23: The method of Clause 22, wherein the global raster granularity depends on a frequency range (FR), and wherein the FR comprises frequencies at or below 3000 MHz.

Clause 24: The method of any one or more of Clauses 22-23, wherein the RF reference frequencies in the global raster are each associated with a new radio (NR) absolute radio frequency channel number (NR-ARFCN), and wherein the subset of RF reference frequencies comprises RF reference frequencies separated by the channel raster granularity within a first range of RF reference frequencies for uplink and a second range of RF reference frequencies for downlink.

Clause 25: The method of Clause 24, wherein the range of RF reference frequencies and the channel raster granularity are associated with an operating band of a plurality of operating bands, and wherein each of the plurality of operating bands are associated with a different range of RF reference frequencies and the same channel raster granularity.

Clause 26: The method of Clause 25, wherein the plurality of operating bands comprise one or more of NR operating bands n1, n2, n3, n5, n7, n8, n12, n13, n14, n18, n20, n24, n25, n26, n28, n29, n30, n34, n38, n39, n40, n50, n51, n53, n65, n66, n67, n70, n71, n74, n75, n76, n80, n81, n82, n83, n84, n85, n86, n89, n90, n91, n92, n93, n94, n95, n97, n98, n99, n100, or n101.

Clause 27: The method of any one or more of Clauses 15-26, wherein the channel raster granularity is associated with long term evolution (LTE) refarming operating bands.

Clause 28: The method of any one or more of Clauses 15-27, wherein the first channel center, the second channel, or both, is within 450 kHz of a synchronization raster frequency location.

Clause 33: The method of any one or more of Clauses 15-28, wherein the first channel center, the second channel, or both, are at a frequency location that is an integer multiple of a subcarrier spacing (SCS).

Clause 34: The method of any one or more of Clauses 1-14, wherein determining the first channel center, determining the second channel center, or both, comprises determining the first channel center, determining the second channel center, or both, based on a synchronization raster, a subcarrier spacing (SCS), whether the channel uses a channel raster granularity different than 100 kHz channel raster granularity, or a combination thereof.

Clause 35: The method of Clause 34, wherein determining the first channel center, determining the second channel center, or both, based on a synchronization raster comprises restricting the determination of the first channel center, the second channel, or both, to channel raster frequency locations within 450 kHz of a synchronization raster frequency location.

Clause 36: The method of Clause 35, wherein restricting the determination of the first channel center, the second channel, or both, to the channel raster frequency locations within 450 kHz of a synchronization raster frequency location is in response to determining the channel uses a channel raster granularity different than 100 kHz channel raster granularity.

Clause 37: The method of any one or more of Clauses 34-36, wherein determining the first channel center, determining the second channel center, or both, based on the SCS comprises restricting the determination of the first channel center, the second channel, or both, to frequency locations that are an integer multiple of the SCS.

Clause 38: A method for wireless communications by a network entity, the method comprising: determining a channel raster comprising a subset of radio frequency (RF) reference frequencies separated by a channel raster granularity, wherein the channel raster granularity is less than 100 kHz; and outputting an indication of one or more of the RF reference frequencies to one or more user equipments (UEs).

Clause 39: The method of Clause 38, wherein the channel raster granularity is 5 kHz, 10 kHz, or 50 kHz.

Clause 40: The method of any one or more Clauses 38-39, further comprising: determining a first channel center for a first channel having a first channel bandwidth at a first RF reference frequency of the subset of RF reference frequencies, wherein the first channel bandwidth consists of an even number of resource blocks (RBs); and determining a second channel center for a second channel having a second channel bandwidth at a second RF reference frequency of the subset of RF reference frequencies, wherein the second channel bandwidth consists of an odd number of total RBs, wherein the first channel bandwidth and the second channel bandwidth overlap in frequency, and wherein RB edges of the first channel bandwidth are aligned with RB edges of the second channel bandwidth.

Clause 41: The method of Clause 40, wherein outputting the indication of the one or more RF reference frequencies comprises: broadcasting a common configuration to the one or more UEs with an indication of one of the first channel center or the second channel center, wherein the common configuration is used by a first UE of the one or more UEs to connect to the network entity; and transmitting dedicated RRC signaling to the first UE with an indication of the other one of the first channel center or the second channel center, wherein the dedicated RRC signaling is used by the first UE to communicate with the network entity after connecting.

Clause 42: The method of any one or more of Clauses 40-41, wherein the first channel center is located at a first resource element (RE) at an edge of a first center RB of the RB s of the first channel bandwidth, and wherein the second channel center is located at a second RE at a center of a second center RB of the RBs of the second channel bandwidth.

Clause 43: The method of any one or more of Clauses 40-42, wherein the first channel center is offset from the second channel center by a multiple of the channel raster granularity.

Clause 44: The method of any one or more of Clauses 40-43, wherein outputting the indication of the one or more RF reference frequencies to the one or more user UEs comprises outputting an indication of the first channel center to a first UE and the second channel center to a second UE.

Clause 45: The method of any one or more of Clauses 40-44, wherein determining the first channel center, determining the second channel center, or both, comprises determining the first channel center, determining the second channel center, or both, based on a synchronization raster, a subcarrier spacing (SCS), whether the channel uses a channel raster granularity different than 100 kHz channel raster granularity, or a combination thereof.

Clause 46: The method of Clause 45, wherein determining the first channel center, determining the second channel center, or both, based on a synchronization raster comprises restricting the determination of the first channel center, the second channel, or both, to channel raster frequency locations within 450 kHz of a synchronization raster frequency location.

Clause 47: The method of Clause 46, wherein restricting the determination of the first channel center, the second channel, or both, to the channel raster frequency locations within 450 kHz of a synchronization raster frequency location is in response to determining the channel uses a channel raster granularity different than 100 kHz channel raster granularity.

Clause 48: The method of Clause 47, wherein determining the first channel center, determining the second channel center, or both, based on the SCS comprises restricting the determination of the first channel center, the second channel, or both, to frequency locations that are an integer multiple of the SCS.

Clause 49: The method of one or more Clauses 38-48, wherein the subset RF reference frequencies comprise a subset of all RF reference frequencies in a global raster having a global raster granularity.

Clause 50: The method of Clause 49, wherein the global raster granularity depends on a frequency range (FR), and wherein the FR comprises frequencies at or below 3000 MHz.

Clause 51: The method of any one or more of Clauses 49-50, wherein the RF reference frequencies in the global raster are each associated with a new radio (NR) absolute radio frequency channel number (NR-ARFCN), and wherein the subset of RF reference frequencies comprises RF reference frequencies separated by the channel raster granularity within a first range of RF reference frequencies for uplink and a second range of RF reference frequencies for downlink.

Clause 52: The method of Clause 51, wherein the first and second ranges of RF reference frequencies and the channel raster granularity are associated with an operating band of a plurality of operating bands, and wherein each of the plurality of operating bands are associated with a different range of RF reference frequencies and the same channel raster granularity.

Clause 53: The method of Clause 52, wherein the plurality of operating bands comprise one or more of NR operating bands n1, n2, n3, n5, n7, n8, n12, n13, n14, n18, n20, n24, n25, n26, n28, n29, n30, n34, n38, n39, n40, n50, n51, n53, n65, n66, n67, n70, n71, n74, n75, n76, n80, n81, n82, n83, n84, n85, n86, n89, n90, n91, n92, n93, n94, n95, n97, n98, n99, n100, or n101.

Clause 54: The method of one or more Clauses 38-53, wherein the channel raster granularity is associated with long term evolution (LTE) refarming operating bands.

Clause 55: The method of one or more Clauses 38-54, wherein outputting the indication of the one or more RF reference frequencies is via broadcast signaling, dedicated radio resource control (RRC) signaling, or a combination thereof.

Clause 56: A method for wireless communications by a user equipment (UE), the method comprising: receiving signaling from a network entity with an indication of a set of radio frequency (RF) reference frequencies of a channel raster, wherein the channel raster includes a subset of RF reference frequencies separated by a channel raster granularity, and wherein the channel raster granularity is less than 100 kHz; and communicating with the network entity using one or more of the set of RF reference frequencies of the channel raster.

Clause 57: The method of Clause 56, wherein the channel raster granularity is 5 kHz, 10 kHz, or 50 kHz.

Clause 58: The method of any one or more of Clauses 56-57, further comprising: receiving signaling from the network entity with an indication of a first channel center for a first channel having a first channel bandwidth at a first RF reference frequency of the subset of RF reference frequencies, wherein the first channel bandwidth consists of an even number of total resource blocks (RBs); and receiving signaling from the network entity with an indication of a second channel center for a second channel having a second channel bandwidth at a second RF reference frequency of the subset of RF reference frequencies, wherein the second channel bandwidth consists of an odd number of total RBs, wherein the first channel bandwidth and the second channel bandwidth overlap in frequency, and wherein RB edges of the first channel bandwidth are aligned with RB edges of the second channel bandwidth.

Clause 59: The method of Clause 58, wherein the first channel center is located at a first resource element (RE) at an edge of a first center RB of the RBs of the first channel bandwidth, and wherein the second channel center is located at a second RE at a center of a second center RB of the RBs of the second channel bandwidth.

Clause 60: The method of any one or more of Clauses 58-59, wherein the first channel center is offset from the second channel center by a multiple of the channel raster granularity.

Clause 61: The method of any one or more of Clauses 58-60, wherein receiving the indication of the one or more RF reference frequencies is via broadcast signaling, dedicated radio resource control (RRC) signaling, or a combination thereof.

Clause 62: The method of Clause 61, wherein receiving the indication of the first channel center, the second channel center, or both comprises: receiving a broadcast common configuration with an indication of one of the first channel center or the second channel center, wherein the common configuration is used by the UE to connect to the network entity; and receiving dedicated RRC signaling with an indication of the other one of the first channel center or the second channel center, wherein the dedicated RRC signaling is used by the UE to communicate with the network entity after connecting.

Clause 63: The method of any one or more of Clauses 58-62, wherein the first channel center, the second channel, or both, is within 450 kHz of a synchronization raster frequency location.

Clause 64: The method of any one or more of Clauses 58-63, wherein the first channel center, the second channel, or both, are at a frequency location that is an integer multiple of a subcarrier spacing (SCS).

Clause 65: The method of any one or more of Clauses 58-64, wherein the subset RF reference frequencies comprise a subset of all RF reference frequencies in a global raster having a global raster granularity.

Clause 66: The method of Clause 65, wherein the global raster granularity depends on a frequency range (FR), and wherein the FR comprises frequencies at or below 3000 MHz.

Clause 67: The method of any one or more of Clauses 65-66, wherein the RF reference frequencies in the global raster are each associated with a new radio (NR) absolute radio frequency channel number (NR-ARFCN), and wherein the subset of RF reference frequencies comprises RF reference frequencies separated by the channel raster granularity within a first range of RF reference frequencies for uplink and a second range of RF reference frequencies for downlink.

Clause 68: The method of Clause 67, wherein the range of RF reference frequencies and the channel raster granularity are associated with an operating band of a plurality of operating bands, and wherein each of the plurality of operating bands are associated with a different range of RF reference frequencies and the same channel raster granularity.

Clause 69: The method of Clause 68, wherein the plurality of operating bands comprise one or more of NR operating bands n1, n2, n3, n5, n7, n8, n12, n13, n14, n18, n20, n24, n25, n26, n28, n29, n30, n34, n38, n39, n40, n50, n51, n53, n65, n66, n67, n70, n71, n74, n75, n76, n80, n81, n82, n83, n84, n85, n86, n89, n90, n91, n92, n93, n94, n95, n97, n98, n99, n100, or n101.

Clause 70: The method of any one or more of Clauses 56-69, wherein the channel raster granularity is associated with long term evolution (LTE) refarming operating bands.

Clause 71: An apparatus, comprising: a memory comprising executable instructions; and a processor configured to execute the executable instructions and cause the apparatus to perform a method in accordance with any one of Clauses 1-70.

Clause 72: An apparatus, comprising means for performing a method in accordance with any one of Clauses 1-70.

Clause 73: A non-transitory computer-readable medium comprising executable instructions that, when executed by a processor of an apparatus, cause the apparatus to perform a method in accordance with any one of Clauses 1-70.

Clause 74: A computer program product embodied on a computer-readable storage medium comprising code for performing a method in accordance with any one of Clauses 1-70.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A network entity, comprising:

one or more memories storing computer executable code; and one or more processors configured, individually or collectively, execute the computer executable code and cause the network entity to:

determining a channel raster comprising a subset of radio frequency (RF) reference frequencies separated by a channel raster granularity, wherein the channel raster granularity is less than 100 kHz;

determine a first channel center for a first channel having a first channel bandwidth at a first RF reference frequency of the subset of RF reference frequencies, wherein the first channel bandwidth consists of an even number of resource blocks (RBs); and determine a second channel center for a second channel having a second channel bandwidth at a second RF reference frequency of the subset of RF reference frequencies, wherein the second channel bandwidth consists of an odd number of total RBs, wherein the first channel bandwidth and the second channel bandwidth overlap in frequency, and wherein RB edges of the first channel bandwidth are aligned with RB edges of the second channel bandwidth; and output an indication of one or more of the RF reference frequencies to one or more user equipments (UEs).

2. The network entity of claim 1, wherein the channel raster granularity is 10 kHz.

3. The network entity of claim 1, wherein the one or more processors being configured to cause the network entity to output the indication of the one or more RF reference frequencies comprises the one or more processors being configured to cause the network entity to:

broadcast a common configuration to the one or more UEs with an indication of one of the first channel center or the second channel center, wherein the common configuration is used by a first UE of the one or more UEs to connect to the network entity; and transmit dedicated RRC signaling to the first UE with an indication of the other one of the first channel center or the second channel center, wherein the dedicated RRC signaling is used by the first UE to communicate with the network entity after connecting.

4. The network entity of claim 1, wherein the first channel center is located at a first resource element (RE) at an edge of a first center RB of the RBs of the first channel bandwidth, and wherein the second channel center is located at a second RE at a center of a second center RB of the RBs of the second channel bandwidth.

5. The network entity of claim 1, wherein the first channel center is offset from the second channel center by a multiple of the channel raster granularity.

6. The network entity of claim 1, wherein the one or more processors being configured to cause the network entity to output the indication of the one or more RF reference frequencies to the one or more user UEs comprises the one or more processors being configured to cause the network entity to output an indication of the first channel center to a first UE and the second channel center to a second UE.

7. The network entity of claim 1, wherein the one or more processors being configured to cause the network entity to determine the first channel center, the second channel center, or both, comprises the one or more processors being configured to cause the network entity to determine the first channel center, the second channel center, or both, based on a synchronization raster, a subcarrier spacing (SCS), whether the channel uses a channel raster granularity different than 100 kHz channel raster granularity, or a combination thereof.

8. The network entity of claim 7, wherein the one or more processors being configured to cause the network entity to determine the first channel center, the second channel center, or both, based on a synchronization raster comprises the one or more processors being configured to cause the network entity to restrict the determination of the first channel center, the second channel, or both, to channel raster frequency locations within 450 kHz of a synchronization raster frequency location.

9. The network entity of claim 8, wherein the one or more processors being configured to cause the network entity to restrict the determination of the first channel center, the second channel, or both, to the channel raster frequency locations within 450 kHz of a synchronization raster frequency location is in response to determining the channel uses a channel raster granularity different than 100 kHz channel raster granularity.

10. The network entity of claim 7, wherein the one or more processors being configured to cause the network entity to determine the first channel center, the second channel center, or both, based on the SCS comprises the one or more processors being configured to cause the network entity to restrict the determination of the first channel center, the second channel, or both, to frequency locations that are an integer multiple of the SCS.

11. The network entity of claim 1, wherein the subset RF reference frequencies comprise a subset of all RF reference frequencies in a global raster having a global raster granularity.

12. The network entity of claim 11, wherein the global raster granularity depends on a frequency range (FR), and wherein the FR comprises frequencies at or below 3000 MHz.

13. The network entity of claim 11, wherein the RF reference frequencies in the global raster are each associated with a new radio (NR) absolute radio frequency channel number (NR-ARFCN), and wherein the subset of RF reference frequencies comprises RF reference frequencies separated by the channel raster granularity within a first range of RF reference frequencies for uplink and a second range of RF reference frequencies for downlink.

14. The network entity of claim 13, wherein the first and second ranges of RF reference frequencies and the channel raster granularity are associated with an operating band of a plurality of operating bands, and wherein each of the plurality of operating bands are associated with a different range of RF reference frequencies and the same channel raster granularity.

15. The network entity of claim 14, wherein the plurality of operating bands comprise one or more of NR operating bands n1, n2, n3, n5, n7, n8, n12, n13, n14, n18, n20, n24, n25, n26, n28, n29, n30, n34, n38, n39, n40, n50, n51, n53, n65, n66, n67, n70, n71, n74, n75, n76, n80, n81, n82, n83, n84, n85, n86, n89, n90, n91, n92, n93, n94, n95, n97, n98, n99, n100, or n101.

16. The network entity of claim 1, wherein the channel raster granularity is associated with long term evolution (LTE) refarming operating bands.

17. The network entity of claim 1, wherein the one or more processors being configured to cause the network entity to output the indication of the one or more RF reference frequencies is via broadcast signaling, dedicated radio resource control (RRC) signaling, or a combination thereof.

18. The network entity of claim 1, wherein the channel raster granularity is 50 kHz.

19. A user equipment, comprising:

one or more memories storing computer executable code; and one or more processors configured, individually or collectively, execute the computer executable code and cause the user equipment to:

receive signaling from a network entity with an indication of a set of radio frequency (RF) reference frequencies of a channel raster, wherein the channel raster includes a subset of RF reference frequencies separated by a channel raster granularity, and wherein the channel raster granularity is less than 100 kHz;

receive signaling from the network entity with an indication of a first channel center for a first channel having a first channel bandwidth at a first RF reference frequency of the subset of RF reference frequencies, wherein the first channel bandwidth consists of an even number of total resource blocks (RBs); and receive signaling from the network entity with an indication of a second channel center for a second channel having a second channel bandwidth at a second RF reference frequency of the subset of RF reference frequencies, wherein the second channel bandwidth consists of an odd number of total RBs, wherein the first channel bandwidth and the second channel bandwidth overlap in frequency, and wherein RB edges of the first channel bandwidth are aligned with RB edges of the second channel bandwidth; and communicate with the network entity using one or more of the set of RF reference frequencies of the channel raster.

20. The user equipment of claim 19, wherein the channel raster granularity is 10 kHz.

21. The user equipment of claim 19, wherein the first channel center is located at a first resource element (RE) at an edge of a first center RB of the RBs of the first channel bandwidth, and wherein the second channel center is located at a second RE at a center of a second center RB of the RBs of the second channel bandwidth.

22. The user equipment of claim 19, wherein the first channel center is offset from the second channel center by a multiple of the channel raster granularity.

23. The user equipment of claim 19, wherein the one or more processors being configured to cause the user equipment to receive the indication of the one or more RF reference frequencies comprises the one or more processors being configured to cause the user equipment to receive the indication of the one or more RF reference frequencies via broadcast signaling, dedicated radio resource control (RRC) signaling, or a combination thereof.

24. The user equipment of claim 23, wherein the one or more processors being configured to cause the user equipment to receive the indication of the first channel center, the second channel center, or both comprises the one or more processors being configured to cause the user equipment to:

receive a broadcast common configuration with an indication of one of the first channel center or the second channel center, wherein the common configuration is used by the UE to connect to the network entity; and receive dedicated RRC signaling with an indication of the other one of the first channel center or the second channel center, wherein the dedicated RRC signaling is used by the UE to communicate with the network entity after connecting.

25. The user equipment of claim 19, wherein the first channel center, the second channel, or both, is within 450 kHz of a synchronization raster frequency location.

26. The user equipment of claim 19, wherein the first channel center, the second channel, or both, are at a frequency location that is an integer multiple of a subcarrier spacing (SCS).

27. A method for wireless communications by a network entity, the method comprising:

determining a channel raster comprising a subset of radio frequency (RF) reference frequencies separated by a channel raster granularity, wherein the channel raster granularity is less than 100 kHz;

determining a first channel center for a first channel having a first channel bandwidth at a first RF reference frequency of the subset of RF reference frequencies, wherein the first channel bandwidth consists of an even number of resource blocks (RBs); and determining a second channel center for a second channel having a second channel bandwidth at a second RF reference frequency of the subset of RF reference frequencies, wherein the second channel bandwidth consists of an odd number of total RBs, wherein the first channel bandwidth and the second channel bandwidth overlap in frequency, and wherein RB edges of the first channel bandwidth are aligned with RB edges of the second channel bandwidth; and outputting an indication of one or more of the RF reference frequencies to one or more user equipments (UEs).

28. A method for wireless communications by a user equipment (UE), the method comprising:

receiving signaling from a network entity with an indication of a set of radio frequency (RF) reference frequencies of a channel raster, wherein the channel raster includes a subset of RF reference frequencies separated by a channel raster granularity, and wherein the channel raster granularity is less than 100 kHz;

receiving signaling from the network entity with an indication of a first channel center for a first channel having a first channel bandwidth at a first RF reference frequency of the subset of RF reference frequencies, wherein the first channel bandwidth consists of an even number of total resource blocks (RBs); and receiving signaling from the network entity with an indication of a second channel center for a second channel having a second channel bandwidth at a second RF reference frequency of the subset of RF reference frequencies, wherein the second channel bandwidth consists of an odd number of total RBs, wherein the first channel bandwidth and the second channel bandwidth overlap in frequency, and wherein RB edges of the first channel bandwidth are aligned with RB edges of the second channel bandwidth; and communicating with the network entity using one or more of the set of RF reference frequencies of the channel raster.

* * * * *